(12) United States Patent
Gao et al.

(10) Patent No.: US 12,095,958 B2
(45) Date of Patent: Sep. 17, 2024

(54) IMAGE-READING DEVICE HAVING CONFIGURABLE MULTI-MODE ILLUMINATION AND MONOCHROME, COLOR IMAGE CAPTURE AND RELATED METHODS COMPRISING A PLURALITY OF LIGHT SOURCES THAT EMIT RED LIGHT OR EMIT WHITE LIGHT FROM MULTIPLE WHITE LIGHT PORTIONS SEPARATED BY A PORTION OF AMBIENT LIGHT

(71) Applicant: Datalogic USA, Inc., Eugene, OR (US)

(72) Inventors: WenLiang Gao, Eugene, OR (US); Aric Brant Zandhuisen, Eugene, OR (US); Michael Jay Ahten, Eugene, OR (US); Robert W. Rudeen, Monroe, CT (US); Keith Layne Rogers, Junction City, OR (US); Brett Thomas Howard, Eugene, OR (US)

(73) Assignee: Datalogic USA, inc., Eugene, OR (US)

( * ) Notice: Subject to any disclaimer, the term of this patent is extended or adjusted under 35 U.S.C. 154(b) by 0 days.

(21) Appl. No.: 18/523,536

(22) Filed: Nov. 29, 2023

(65) Prior Publication Data
US 2024/0098198 A1    Mar. 21, 2024

Related U.S. Application Data

(63) Continuation of application No. 17/154,512, filed on Jan. 21, 2021, now Pat. No. 11,843,744.

(51) Int. Cl.
*H04N 1/028*    (2006.01)
*H04N 1/00*    (2006.01)

(52) U.S. Cl.
CPC ..... *H04N 1/00822* (2013.01); *H04N 1/00811* (2013.01); *H04N 1/00931* (2013.01); *H04N 1/02815* (2013.01)

(58) Field of Classification Search
CPC ... G06K 19/06028; G06K 2007/10495; G06K 7/10584; G06K 7/10732; G06K 7/1095;
(Continued)

(56) References Cited

U.S. PATENT DOCUMENTS 7,234,641 B2    6/2007    Olmstead
7,527,206 B2    5/2009    Zhu et al.
(Continued)

FOREIGN PATENT DOCUMENTS

JP    2013-073286 A    4/2013

*Primary Examiner* — Chad Dickerson
(74) *Attorney, Agent, or Firm* — Shook, Hardy & Bacon L.L.P.

(57) ABSTRACT

An image-reading device, such as optical code readers used in retail environments to scan objects, is configured to select from various operational modes. The operational modes are selected based on an application of the image-reading device, such as optical code identification or image recognition. Red, white, and other color light sources are activated in patterns corresponding to an illumination sequence of the selected operational mode, while imagers are activated to capture an image based on an exposure pattern of the selected operational mode. Further, a repeating series of light pulses having different portions of light is provided. Various imagers are configured to capture images over one of the portions. This allows an operator to perceive one continuous light pattern, yet allows various imagers to capture an image under different light conditions used for different applications of the image-reading device.

20 Claims, 11 Drawing Sheets

(58) Field of Classification Search
CPC .............. G06K 7/1096; G06K 2215/00; G06K 2207/00; H04N 1/00931; H04N 1/02865; H04N 1/00811; H04N 1/00822; H04N 1/02815; H04N 1/00657; G06Q 20/202; G06Q 20/208; G07G 1/0018; G07G 1/0045
USPC ............ 358/475; 235/462.41, 469, 435, 439, 235/454, 462, 472.01, 472.02, 472.03
See application file for complete search history.

(56) References Cited

U.S. PATENT DOCUMENTS

| | | |
|---|---|---|
| 7,780,089 B2 | 8/2010 | Wang |
| 8,657,196 B2 | 2/2014 | Olmstead |
| 9,004,359 B2 | 4/2015 | Shearin et al. |
| 9,033,240 B2 | 5/2015 | Smith et al. |
| 9,305,198 B2 | 4/2016 | Thompson et al. |
| 9,594,936 B1* | 3/2017 | Gao ..................... G06K 7/1095 |
| 10,049,247 B2 | 8/2018 | Gao |
| 10,326,943 B2 | 6/2019 | Crooks et al. |
| 10,460,574 B2 | 10/2019 | Barkan et al. |
| 10,691,905 B2 | 6/2020 | Drzymala et al. |
| 2007/0284447 A1 | 12/2007 | McQueen |
| 2012/0181338 A1* | 7/2012 | Gao ......................... G06K 7/12 235/455 |
| 2013/0026233 A1 | 1/2013 | Chen et al. |
| 2013/0126618 A1* | 5/2013 | Gao ......................... G06K 7/10 235/469 |
| 2013/0327829 A1* | 12/2013 | Thompson ......... G06K 7/10841 235/440 |
| 2013/0327831 A1 | 12/2013 | Howard |
| 2016/0364936 A1* | 12/2016 | Gao ....................... H04N 23/56 |
| 2018/0101708 A1* | 4/2018 | Gao ................... G06K 7/10811 |
| 2018/0307880 A1* | 10/2018 | Gao ......................... G06K 7/12 |
| 2021/0012076 A1 | 1/2021 | Barkan et al. |

* cited by examiner

IMAGE-READING DEVICE HAVING CONFIGURABLE MULTI-MODE ILLUMINATION AND MONOCHROME, COLOR IMAGE CAPTURE AND RELATED METHODS COMPRISING A PLURALITY OF LIGHT SOURCES THAT EMIT RED LIGHT OR EMIT WHITE LIGHT FROM MULTIPLE WHITE LIGHT PORTIONS SEPARATED BY A PORTION OF AMBIENT LIGHT

CROSS-REFERENCE TO RELATED APPLICATIONS

This application is a continuation of U.S. application Ser. No. 17/154,512 filed Jan. 21, 2021, which is incorporated herein by reference.

BACKGROUND

Image-reading devices, such as those used by store checkout attendants are used to identify objects. Some image-reading devices identify and capture optical codes, such as two-dimensional codes (e.g., Quick Response (QR) codes), one-dimensional bar codes, as well as high density codes, Dot codes, watermarking (e.g., Digimarc), optical character recognition (OCR), and other visual code and image recognition techniques for identifying an object. For example, upon identifying and capturing the optical codes, the optical codes are decoded to provide information represented by the optical code. In the scenario of the store checkout attendant, the optical code is then processed to provide information about an associated object. Bioptic style image-reading devices, those that identify and capture objects along two spatial planes, are popular for high-volume applications because these devices can identify objects across more spatial orientations. Thus, the need to manipulate the object's spatial orientation is reduced.

While some image-reading devices are capable of using ambient light as an illumination source, many conventional image-reading devices have a light source that illuminates an area. The light source helps the image-reading device more clearly identify the object within the area. The inventors have appreciated various improvement to illumination systems for image-reading devices.

SUMMARY

At a high level, aspects described herein relate to an image-reading device having a multi-mode configuration. The image-reading device is configured to select from one of several operational modes based on a selection event, such as a manual input or automatically based on the intensity of available ambient light, the speed of an object moving through an area, or an object weight being detected, or with a pre-determined algorithm.

A first operational mode that can be selected includes a first illumination sequence having continuous activation of a light source before a first triggering event and a first exposure sequence having continuous activation of an imager before the first triggering event. A second operational mode includes a second illumination sequence having temporary activation of the light source before a second triggering event and a second exposure sequence having temporary activation of the imager after the second triggering event. A third operational mode includes a third illumination sequence having temporary activation of the light source after a third triggering event and based on an intensity of ambient light, and a third exposure sequence having temporary activation of the imager after the third triggering event.

When the operational mode is selected, a controller of the image-reading device activates a light source and an imager to capture an image based on an illumination sequence and an exposure sequence of the selected operational mode. The controller can activate the light source or the imager before or at the occurrence of a triggering event based on the selected operational mode.

Another embodiment of the technology includes activating light sources so that a repeating series of light pulses is produced. The repeating series of light pulses includes portions of red, white, and ambient light.

Different imagers associated with the image-reading device can be activated to capture an image during one of the light pulse portions. In this way, images under the red, white, and ambient lighting conditions can be captured. The different captured images can be used for different applications, as each color or ambient condition has benefits for particular applications. Short red pulses and short white pulses are good for image identification and optical code reading. Longer white pulses are good for object recognition. Ambient lighting is good for reading objects on reflective or glossy surfaces, such as an optical code or other image displayed on a mobile device screen.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
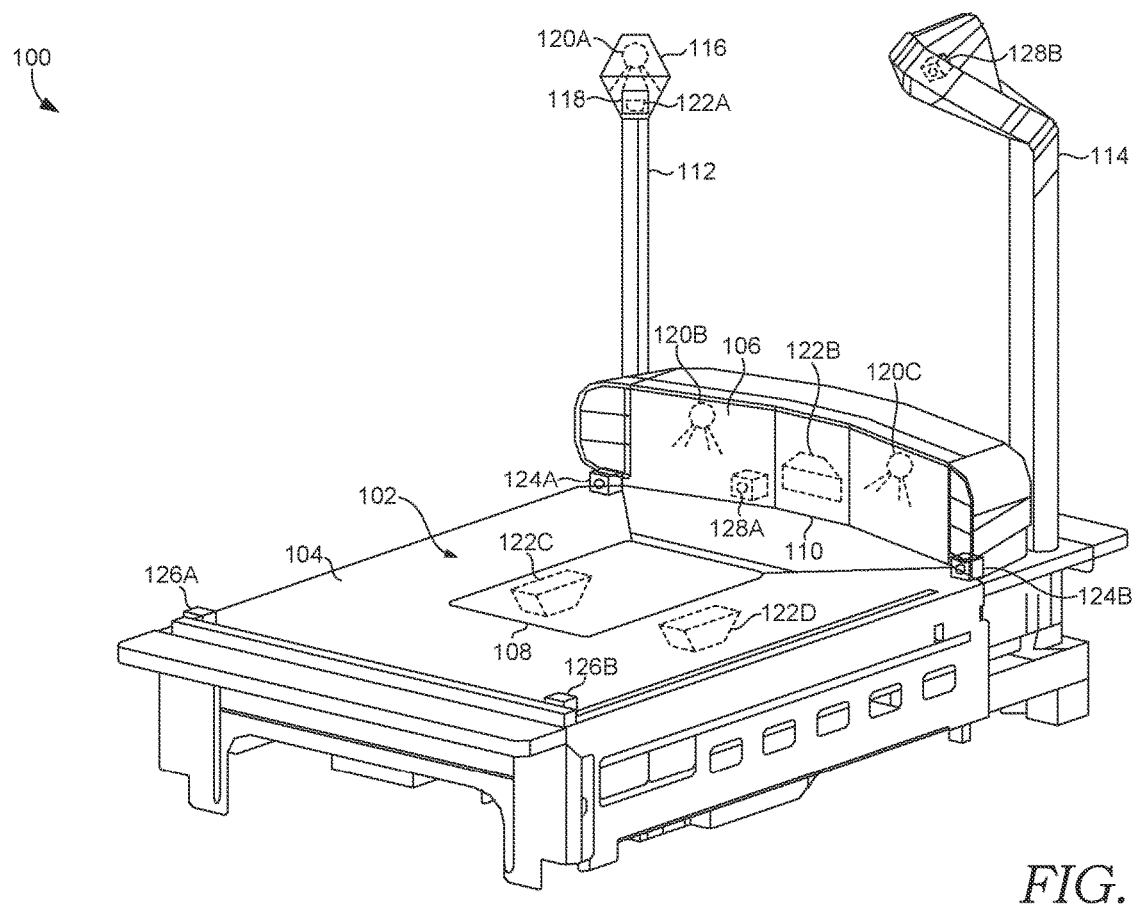
FIG. 1 is an example image-reading device suitable for use with aspects of the described technology, in accordance with an aspect descried herein.

As noted in the Background, image-reading devices (e.g., optical code readers) may illuminate an area to better identify and capture an image of an object. These conventional image readers typically have bright lights used for the illumination. Combining the bright lights with multiple plane readers, like bioptic style image-reading devices, can result in some illumination that is observed by an operator. This can be distracting and sometimes reduces the overall user-friendliness when operating the image-reading devices.

Further, illumination types and sources can be different depending on the image reader's application. For instance, an image-reading device located near a window in a store might have enough ambient light during the day to identify and capture images of objects. However, at night, the image-reading device may require additional illumination to effectively identify and capture images of the same objects, especially when the timing opportunity to capture such images is narrow. Further still, the image-reading device might be used for different applications, such as capturing an image of a barcode and decoding the information versus capturing an image of a piece of fruit to identify the type of fruit. Here, enhanced optical recognition and illumination techniques help to better identify the fruit, but the additional light from these techniques may not be necessary for all other applications, such as capturing an image of the barcode.

Conventional technologies lack techniques that change illumination and capture modes to fit a particular application or condition. Because of this, the image-reading device placed near a window might use illumination techniques needlessly during the day, as the illumination is needed only during nighttime hours. Similarly, the image-reading device might be configured to emit a longer, more intense form of illumination that is beneficial when capturing an image to identify objects like the piece of fruit, but this same illumination is not necessarily needed when capturing a barcode image. In both scenarios, the image-reading device is not operating efficiently, and it could be needlessly exposing operators and others nearby to bothersome illumination.

The technology of this disclosure solves some of the problems that are currently experienced with the conventional technology. In particular, some aspects of the disclosed technology provide a configurable multi-mode illumination. The various modes can be configured for the specific application or condition. For instance, one mode may be used for capturing images of a barcode or other optical code for decoding, while another mode is used to capture an image of an object (a produce item, fruit, vegetable, etc.) for item identification. Similarly, one mode may be used during the day when there is enough ambient light present for sufficient image capture, while another mode is used when ambient light is not sufficient. Moreover, the configurable multi-mode illumination that will be further described provides technology that allows an operator to continually use an image-capture device when presented with different application needs, including illumination for a barcode versus illumination for object identification and recognition, instead of stopping between applications or switching to a different hardware device, such as a portable hand scanner.

Additional aspects of the technology provide illumination schemes to capture monochrome, color, or ambient light images under active or ambient illumination. This provides a way to take red, white, and ambient light exposures, and allow combined white and ambient exposures as they are needed. These techniques provide a mechanism by which the image-reading device has access to each exposure type that is best for each application, meaning that the exposure types are accessible within each frame time. This reduces the outside input needed to operate image-scanning-device technology that utilizes various illumination techniques depending on the application. At the same time, the illumination schemes appear consistent when observed by the operator. By making the illumination consistent, the observer acclimates to the particular illumination. This desensitizes the operator to the illumination, making the illumination less obtrusive and gradually imperceptible.

One example method that realizes these benefits includes a configurable multi-mode illumination and an image capture method. Under this method, an image-reading device utilizes at least one of a plurality of operational modes, where each operational mode defines an illumination sequence and an exposure sequence. Here, the illumination sequence provides instructions to activate a light source to emit light, while the exposure sequence provides instructions for capturing an image using an imager. An operational mode can be selected based on a particular application of the image-reading device, and may be selected based on a particular triggering event. Thus, the image-reading device can be used for various applications, such as reading an optical code or capturing an image of an object to identify and recognize the object, and in various conditions, such as low-ambient light conditions and high-ambient light conditions. Conventional systems are static and cannot be configured to optimally perform over the different applications and conditions.

Example operational modes that may be selected include a first mode that has a continuously active light and has a continuously active imager. The continuous light is beneficial because it does not appear to flicker, which reduces an operator's perception of the light. Further, the continuous image capture is beneficial in particular use scenarios where there is a higher volume of object recognition relative to tasks such as reading an optical code.

A second example operational mode includes temporarily activating the light source and the imager in response to a triggering event, such as detecting an object weight, a speed of the object through the area over which the imager captures the image, a manual input by the operator, comparing an ambient light to an illumination threshold, or any other such triggering event and combinations thereof. This mode has benefits over conventional systems because activation of the light is temporary and based on a triggering event. In this way, the operator may not experience a constant illumination, but rather, the light can be activated when needed based on the application.

A third operational mode includes temporarily activating the light source and the imager in response to the triggering event, where activation of the light is also based on an intensity of ambient light. This mode also has benefits over conventional systems because the light can be activated when there is not enough ambient light. In this way, the user experiences the additional light emitted by the light source when the light source is needed. This mode is also more efficient than conventional systems because it uses ambient light when the ambient light is suitable for the particular application, rather than constantly activating the light source, including activating the light source during times it is not needed due to the availability of ambient light.

Another method that achieves such benefits over conventional systems uses light pulses that allow red, white, and ambient exposures to be taken, and allows for combined white and ambient exposures when needed. Conventional systems do not utilize red, white, and ambient light. However, each type of light has benefits. The red light may provide certain benefits for recognition of optical codes, the white light may provide certain benefits for image recognition, and the ambient light may provide certain benefits for imaging objects with reflective or glossy surfaces, such as objects within plastic or displayed on the screen of a mobile device.

This example method includes using pulses of light in a repeating series, where each pulse may be the same. That is, each pulse has a portion of red light, a portion of white light, and a portion of the pulse that is formed of ambient light. The red and white light can be emitted through activation of one or more light sources, while the ambient light may be provided from light emitted by a light source that is not part of the image-reading device. To capture images using the red light, white light, or the ambient light, a first imager is activated for exposure period corresponding to one of the portions. A second imager is activated for different exposure period that corresponds to another portion. In this way, the image from the first imager can be used for a particular application, such as reading an optical code, performing image recognition, or reading an image displayed on a mobile device, while the image from the second imager is used for a different application.

By using pulses of light in a repeating series, an operator observes the same pulse pattern, even though the image-reading device is using different portions of the light pulse for different applications. This helps keep the operator from observing random changes in the light as the application changes, and thus makes it more likely that the operator will acclimate to the light pulses.

The aspects previously described are provided as examples to aid in understanding the technology and to show the benefits that can be attained through practice of the technology. These aspects are only examples that may be derived from the description that follows, which references the figures.

Operating Environment

Figure 2:
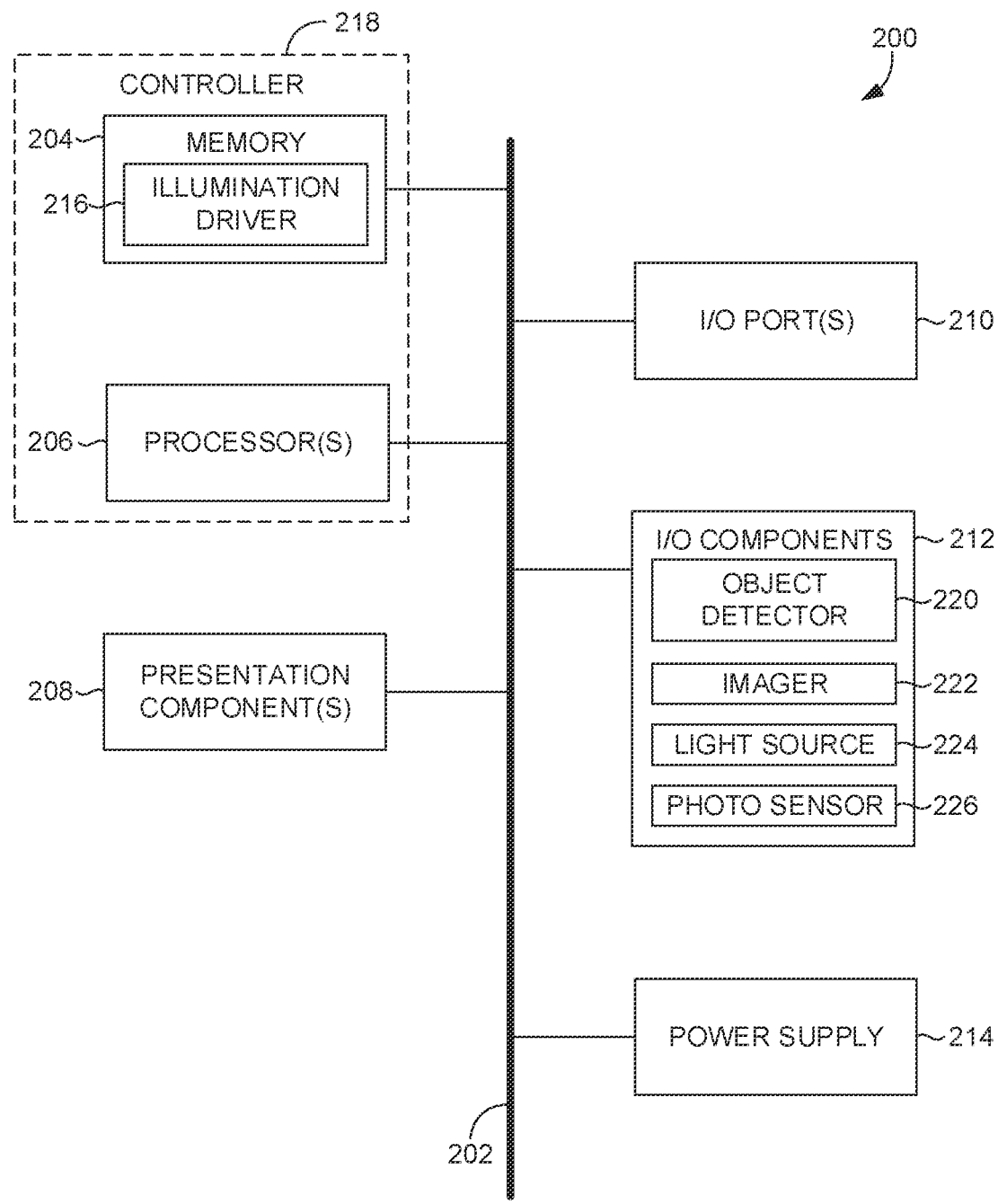
FIG. 2 is an example computing device configured to operate the image-reading device of FIG. 1, in accordance with an aspect described herein.

FIG. 1 provides an example image-reading device 100 suitable for use with aspects of the disclosed technology. FIG. 2 provides an example computing device 200 configured to operate image-reading device 100. Together, FIG. 1 and FIG. 2 provide an example operating environment in which aspects of the disclosed technology may be employed.

Referring first to FIG. 1, image-reading device 100 is a bioptic optical code reader that comprises base 102 that includes horizontal section 104 and vertical section 106. In the example illustrated, horizontal section 104 includes horizontal window 108, while vertical section 106 includes vertical window 110. Horizontal window 108 and vertical window 110 are translucent or transparent to light. Horizontal section 104 and vertical section 106 may be included within base 102.

While not illustrated, horizontal section 104 can be included as part of a scale provided at base 102. When an object is placed within the area of base 102 on top of horizontal section 104, the scale detects the object's weight and provides this to a controller.

Image-reading device 100 comprises one or more top-down readers, such as first top-down reader 112 and second top-down reader 114. Top-down readers may comprise a light source. In some cases, the light sources are inside a top-down reader housing having a top-down reader window. As an example, in FIG. 1, first top-down reader 112 is shown having first top-down reader housing 116 that comprises first top-down reader window 118, which conceals first top-down reader light source 120A. Similar components of second top-down reader 114 are not labeled or illustrated for clarity.

In general, any number of light sources, such as first top-down reader light source 120, may be included as part of image-reading device 100 and provided at any location, whether physically attached or remote. For example, image-reading device 100 further includes light sources 120B and 120C. Generally, light sources comprise an emitter configured to emit light of any wavelength. Light sources suitable for use are further discussed with reference to FIG. 2. Accordingly, light sources 120A-C and any other light sources that may be included as part of image-reading device 100 may emit white, infrared, ultraviolet, red, blue, or green light, or any combination or sequence thereof, among other light colors or wavelengths.

Image-reading device 100 includes one or more imagers, such as imagers 122A—D illustrated within various locations of image-reading device 100. This may include one or more monochrome imagers, one or more color imagers, or any combination thereof. For instance, imagers may be within base 102, such as imagers 122B-D, or within a top-down reader, such as imager 122A in first top-down reader 112, among other locations. In general, an imager may include an image sensor and a lens that provide a field of view within which an image of an object may be captured by detecting light or another form of electromagnetic radiation, and converting it into communication signals providing associated image information. It should be understood that more or fewer imagers may be provided in each of the horizontal section 104 or vertical section 106 of the base 102 or the top down readers 112, 114 and at different locations than those specifically shown in FIG. 1. Imagers may include monochrome imagers, color imagers, or a combination thereof throughout the image-reading device 100. Some imagers are described in more detail with reference to FIG. 2.

Continuing with FIG. 1, image-reading device 100 further comprises one or more object detectors. Object detectors discussed with reference to FIG. 2 are suitable for use as the object detectors illustrated in FIG. 1. It will be understood that various object detection techniques are available, and that the hardware elements illustrated in FIG. 1 are meant to provide one example and are not intended to be limiting in any sense. The one or more object detectors shown in FIG. 1 use a light detection technique to determine whether an object is within the area of image-reading device 100, which will be further discussed with reference to FIG. 2. However, in this example, the one or more object detectors comprise light emitters 124A and 124B, and light detectors 126A and 126B.

Image-reading device 100 may comprise one or more photosensors disposed at any location. Image-reading device 100 is illustrated having photosensors 128A and 128B. Here, photosensor 128A is disposed at base 102, and photosensor 128B is disposed at second top-down reader 114. Photosensors generally detect light and may determine an intensity of the light. Some photosensors determine an intensity of particular wavelengths of light, such as wavelengths associated with white, red, blue, and green lights. Photosensors are further described with reference to FIG. 2. As noted in the discussion related to FIG. 2, imagers may act as photosensors as well, meaning that an imager can also be used to detect light or determine the intensity of light. Thus, some applications of image-reading device 100 may not include photosensors. Instead, image-reading device 100 may rely on the imagers to perform these functions, instead. Both embodiments, and any combinations thereof, are intended to be within the scope of this disclosure.

It should be understood that FIG. 1 has been provided only as an example of a type of image-reading device suitable for use with the technology. It will be recognized that the technology can be employed in other devices, such as mounted devices or handheld units. Other devices may include additional or fewer components, or comprise other arrangements of components.

An additional example image-reading device includes the data reader described in U.S. Pat. No. 10,049,247 that granted from U.S. application Ser. No. 15/292,037 filed with the United States Patent and Trademark Office on Oct. 12, 2016, the contents of which are expressly incorporated herein by reference in their entirety. Yet another example image-reading device sufficient for use is described in U.S. Pat. No. 9,305,198 that granted Apr. 5, 2016 from U.S. application Ser. No. 13/911,854 filed with the United States Patent and Trademark Office on Jun. 6, 2013, the contents of which are expressly incorporated herein by reference in their entirety.

Turning now to FIG. 2, an example computing device 200 suitable for and configured to operate image-reading device 100 of FIG. 1 is provided. Computing device 200 is one example of a suitable computing environment and is not intended to suggest any limitation as to the scope of use or functionality of the technology. Computing device 200 should not be interpreted as having any dependency or requirement relating to any one or combination of components illustrated.

Some aspects of the technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network. In a specific implementation, the technology is practiced in an image-reading device, such as image-reading device 100 in FIG. 1. In one aspect, computing device 200 may be a special-purpose computing device configured to be implemented with an image-reading device.

With continued reference to FIG. 2, computing device 200 includes bus 202 that directly or indirectly couples the following devices: memory 204, one or more processors 206, one or more presentation components 208, input/output ports 210, input/output components 212, and illustrative power supply 214. Bus 202 represents what may be one or more busses (such as an address bus, data bus, or combination thereof).

Although the various blocks of FIG. 2 are shown with lines for the sake of clarity, in reality, delineating various components is not so clear, and metaphorically, the lines would more accurately be grey and fuzzy. For example, one may consider a presentation component such as a display device to be an I/O component. Additionally, processors can have memory. It will be appreciated that this is the nature of the art. As such, it is reiterated that the diagram of FIG. 2 is merely illustrates an example computing device that can be used in connection with aspects of the present technology.

Computing device 200 typically includes a variety of computer-readable media. Computer-readable media can be any available media that can be accessed by computing device 200 and includes both volatile and nonvolatile media, removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and can be accessed by computing device 200. Computer storage media is non-transitory and excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared, Bluetooth, and other wireless media. Combinations of any of the above should also be included within the scope of computer-readable media.

Memory 204 includes computer storage media in the form of volatile or nonvolatile memory. The memory may be removable, non-removable, or a combination thereof. Example hardware devices include solid-state memory, hard drives, optical-disc drives, etc.

Some aspects of the technology provide for illumination driver 216. In general, illumination driver is stored on memory 204 and is suitable for applying signals to a light source, including various light sources. That is, illumination driver 216 serves to allow one or more processors 206 to activate or otherwise control the light source. Accordingly, illumination driver 216 drives the light source by providing a series of pulses having a given pulse width. In general, increasing the pulse width increases the time the light source is activated during an illumination pulse cycle (e.g., by increasing the duty cycle of an illumination waveform).

Computing device 200 includes one or more processors 206 that read data from various entities such as memory 204 or I/O components 212.

Some aspects of the technology implement or are implemented by controller 218. Controller 218 can include memory, such as memory 204, and one or more computer processors, such as processors 206, executing instructions that cause the processors to perform operations. In general, controller 218 controls and coordinates the operation of other devices, including various I/O components 212, such as object detector 220, imager 222, and light source 224.

Object detector 220 generally detects the presence of an object. Object detector 220 can be configured to detect the presence of the object that is located in, that enters, or that is removed from a particular location. One example technology suitable for use as object detector 220 is a laser detector. Here, light is emitted from a laser emitter. The light is detected by a laser detector. When the object enters the area, it blocks the light, and the laser detector sends a signal to controller 218 that the light is not being detected. Controller 218 interprets this signal as the object being located in the area over which the light is emitted by the laser emitter. This is just one example that can be used; however, it will be recognized that other technologies are also suitable as an object detector, such as mechanical technologies that physically interact with the item or object, or another optical technology that senses the presence of the item or object, for instance optical technology that senses the presence from the image data itself. In another example, a combination of an imager and light source may serve as object detector 220. Light source 224 may be operable by illumination driver 216.

Imager 222 generally captures an image. Imager 222, when activated, takes an image from light received via a lens focusing the light onto imager 222. Imager 222 may be configured to take an image of an area and any object located in the area of its field of view. Imager 222 may receive light, ambient or from a light source of an image-reading device, and form electronic image data representative of the image. Some aspects provide the image data to a digital signal processor or other decoder interfaced to imager 222 in order to read the image data. Imager 222 may comprise a wide range of image-sensing technologies that convert optical images of various wavelengths, including those within the visible spectrum. In one example, imager 222 is a charged-coupled device (CCD) or complementary metal-oxide semiconductor (CMOS) imager. As previously noted, some components are discussed separately to aid in describing the technology. However, some components can be separate components, or integrated into the same hardware. For instance, imager 222 may also serve to function as object detector 220.

Light source 224 comprises hardware elements that emit forms of electromagnetic radiation. Generally, these will be wavelengths associated with the visible light spectrum, such as wavelengths about equal to or between 380 nm and 750 nm. Other hardware elements intended to be included may emit electromagnetic radiation outside of these wavelengths, as these wavelengths can still be detected by detectors, even if there are not visible to the human eye. One such example is infrared electromagnetic radiation having wavelengths about equal to or between 700 nm to 1 mm, while another is ultraviolet having wavelengths about equal to or between 10 nm to 400 nm. Unless otherwise stated, light sources can emit or be configured to emit any wavelength of electromagnetic radiation, including any wavelength within the visible spectrum or infrared spectrum. In specific implementations, lights emit wavelengths associated with visible white light, red light, blue light, green light, or any combination or sequence thereof. Light source 224 may include any one of or combination of suitable light sources, including light emitting diodes (LEDs), flash strobes, incandescent lamps, fluorescent lamps, halogen bulbs, and so forth.

Photosensor 226 generally detects electromagnetic radiation. Photosensor 226 can detect electromagnetic radiation, including that within the visible light spectrum, and generate a current based on the intensity of the detected electromagnetic radiation. Photosensor 226 is communicatively coupled to controller 218. Controller 218 receives the generated current from photosensor 226 and processes it to determine the intensity of the light detected by photosensor 226. Photosensor 226 can detect light generated by components of an image-reading device, such as image-reading device 100 of FIG. 1, or ambient light emanating from sources other than the image-reading device. One example suitable for use is a photodiode. In an aspect, an imager can act as a photosensor, such as photosensor 226 in addition to or in lieu of performing other functions of the imager.

Presentation component 208 presents data indications to a user or other device. Examples of presentation components suitable for use as presentation component 208 include a display device, speaker, printing component, vibrating component, and the like. One specific presentation component included within presentation component 208 is a touch screen display. The touch screen display further acts as an I/O component that can be included within I/O component 212. Here, the touch screen display can provide a graphical user interface having an input area that allows an operator to manually select a particular option, including a configuration option. Using this method, the operator can manually provide an input to controller 218 indicating to the controller to change a mode of operation.

I/O ports 210 allow computing device 200 to be logically coupled to other devices including I/O components 212, some of which may be built in. Illustrative components include a microphone, joystick, game pad, satellite dish, scanner, printer, wireless device, etc. One I/O component that is included within I/O components 212 is a button that, when engaged by an operator, sends a signal to controller 218, which controller 218 interprets and changes an operational mode in accordance with the received signal.

Configurable Multi-Mode Illumination and Image Capture

As previously discussed, an image-reading device, such as image reading-device 100 of FIG. 1, may be configured to provide various operational modes. Each of the different operational modes may be beneficial because many image-reading devices are used for different applications, and some operational modes may perform relatively better for a particular application or situation. Further, the various operational modes can be initiated to increase the efficiency of the image-reading device, while at the same time, making the device more user friendly.

In some implementations, configurable operational modes are performed using an image-reading device having one or more top-down readers, which may include light sources or imagers, among other components. A top-down reader can be configured to operate with a base, such as those example image-reading devices previously described. Top-down readers can be configured to work with any computing device, including a point-of-sale computer.

Figure 3:
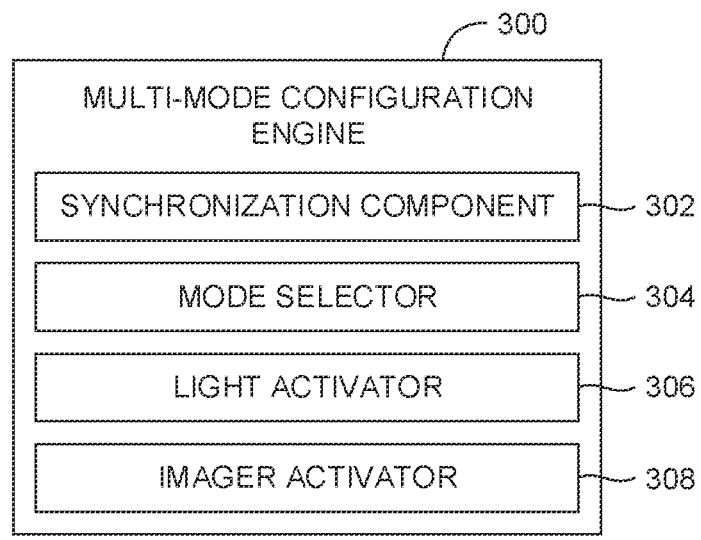
FIG. 3 illustrates an example multi-mode configuration engine suitable for use with an image-reading device, in accordance with an aspect described herein.

FIG. 3 illustrates an example multi-mode configuration engine 300. In general, multi-mode configuration engine 300 can be employed to provide the technology with configurable operational modes.

Multi-mode configuration engine 300 is illustrated as having synchronization component 302, mode selector 304, light activator 306, and imager activator 308. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, or software. For instance, various functions may be carried out by a processor executing instructions stored in memory. Various functions may be carried out by a controller of an image-reading device, such as those image-reading devices previously discussed.

When using the top-down reader in conjunction with the base for illumination and exposure, it may be beneficial to synchronize activation of light sources between the base and the top-down reader. Such synchronization may be carried out by synchronization component 302 of multi-mode configuration engine 300.

Synchronization component 302 is configured to synchronize the timing of activation light sources or imagers located in a top-down reader and a base. It will be recognized that synchronization can be performed for light sources positioned at any location of an image-reading device. Two methods that can be employed by synchronization component 302 are provided as examples and illustrated in FIGS. 4-5.

Figure 4:
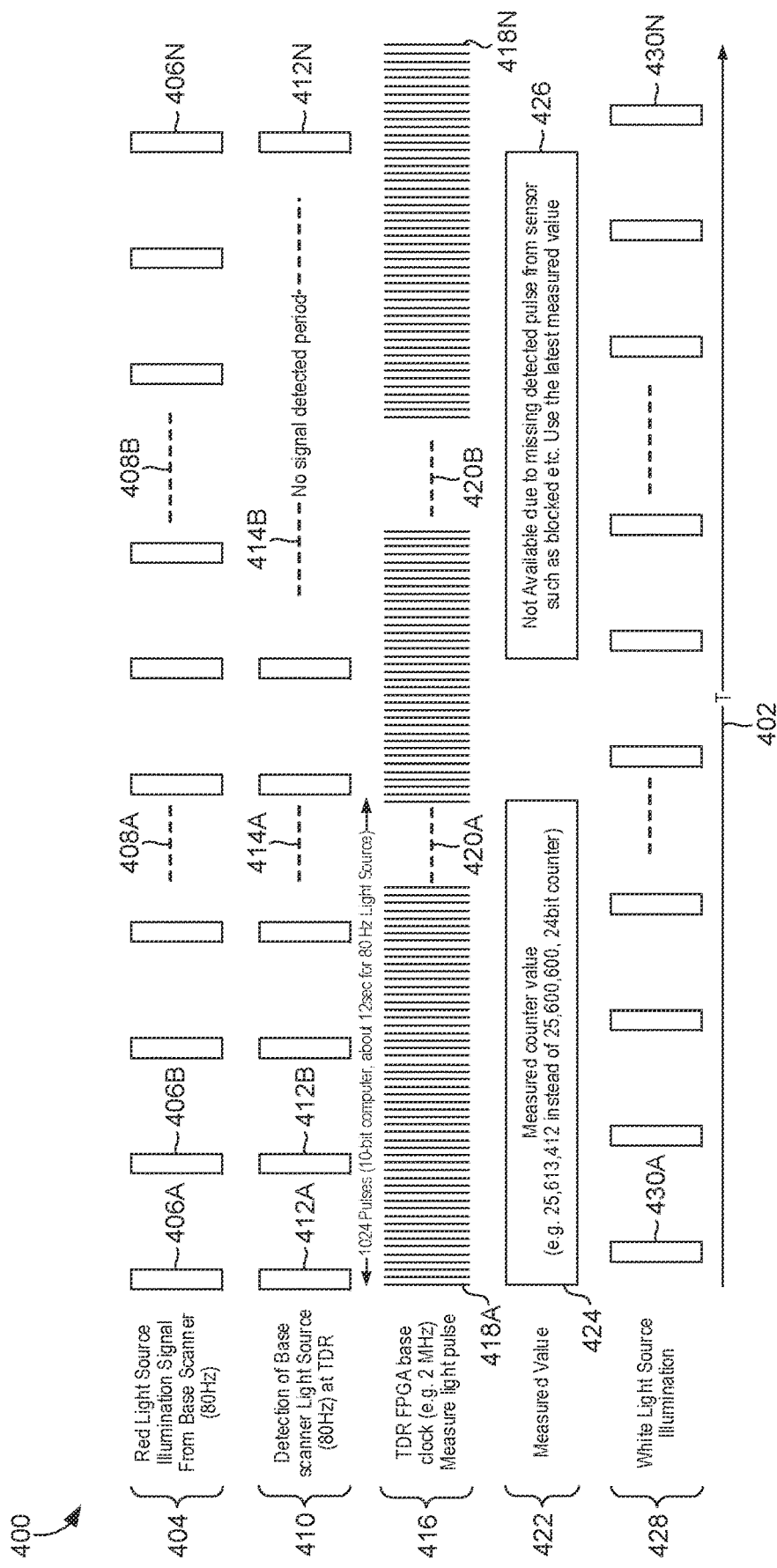
FIG. 4 is an example timing diagram for wireless synchronization of light sources, in accordance with an aspect described herein.

FIG. 4 illustrates an example timing diagram 400 for wireless synchronization of light source between the base and the top-down reader or another remote reader. In this particular example, a red pulse being emitted by a red light source, such as a red LED, is located in the base of the image-reading device. A white pulse is being emitted from a white light source, such as a white LED, is located in the top-down reader. An imager is also provided at the top-down reader to capture images. It will be understood that a different arrangement of components may be used, and timing diagram 400 would be adjusted accordingly. In one example, the wireless synchronization includes synchronizing timing using a photosensor in addition to or in lieu of an imager.

Wirelessly synchronizing the light sources and imagers may provide a mechanism by which the technology can utilize a wireless top-down reader or other remote device, while maintaining proper timing between activation of the light sources relative to the imagers for capturing images. That is, wireless synchronization may provide a way to activate light sources in a particular pattern and capture images using an imager at times coinciding to the light source pattern. Thus, for instance, the timing is synchronized such that an imager can be activated to capture an image over an exposure period, during which a light is also being activated, even when the light source and the imager are remote and not physically connected by a direct-wired connection. As such, where an imager is located in the base of an image-reading device and a light source is located in a wirelessly connected top-down reader, or vice versa, the timing of the imager activation accurately coincides with the timing of the light source activation. As such, light pulses, such as red light pulses, may be programmed to occur during the time in which imagers are used to capture images, such as monochrome imagers for capturing images during red light pulses (e.g., for barcode decoding). Moreover, the synchronization may be applied to different light sources as well. Thus, the activation of remote light sources, such as those in a base and those in a top-down reader, can be timed to provide a particular light sequence or pattern. One example pattern includes immediate activation of a white light source after activating a red light source, where the red light source and the white light source are wireless remote from one another.

As noted, timing diagram 400 illustrates one example of synchronizing remote imagers and light sources. In this specific case, the red light source is located in the base, while an imager and a while light source are located in a top-down reader. To illustrate the synchronization, timing diagram 400 includes time 402 represented horizontally and increasing moving from left to right. Row 404 illustrates an illumination sequence for a red light source positioned at the base (e.g., in the horizontal or vertical portions) and pulsed at 80 Hz. The red light source emits red light pulses when activated. Red light pulses 406A and 406B are labeled as examples to illustrate the relative timing of the red light pulses of row 404. The red light pulses continue indefinitely, as illustrated using ellipses 408A and 408B, continuing to red light pulse 406N, which represents any number of red light pulses.

Row 410 illustrates activation of the imager. Exposure periods 412A and 412B are labeled as examples, and are intended to illustrate the times over which the imager is activated and detecting the red light pulses. Activation of the imager continues indefinitely, as illustrated using ellipses 414A, and continuing to exposure period 412N, which represents any number of exposure periods. The imager here is activated at the same rate the red light source is pulsed, which is 80 Hz in this example. Ellipsis 414B illustrates the imager is not detecting the red light pulses during a second period of time, further discussed below. In an example where the photosensor is used, exposure periods, such as exposure periods 412A and 412B comprise the time during which the photosensor detects the red light pulses.

Row 416 illustrates a timing sequence of a field programmable gate array (FPGA) programmed to measure the red light pulses captured by the imager during the exposure periods. In this example, the FPGA clock measures the red light pulses, such as red light pulses 406A-N. The FPGA clock in this example can be configured to measure the red light pulses at a frequency of 2 MHz. This is just one example, and other frequency rates may be used, including programming the FPGA at higher frequency rates to increase the accuracy of the synchronization. The frequency rate is illustrated in row 416 using an indefinite frequency illustrated by pulses 418A through 418N and ellipses 420A and 420B. By programming the FPGA to measure the red light pulses captured by the imager during the exposure periods using a frequency less than the frequency of the light source activation and the exposure period, the time over which the red light source is pulsed during imager activation can be measured. Synchronization of the imager and the red light source may be performed by adjusting the phase of the red light pulses or the exposure periods in order to maximize measured time determined by the FPGA. In this example, the phase of the exposure periods of the activated imager is synchronized with the phase of the red light pulses of the wireless, remote light source. In an example method reduced to practice, the measured counter value from the FPGA clock was 25,613,412. This is in contrast to the theoretical measurement of 25,600,000. This was done using a 24-bit counter. MOD and QUOTIENT functions from Excel can be used to calculate these values. The overflow was not found to have a negative effect on the synchronization. The measured values in the example reduced to practice are provided in box 424 of row 422. This measure was taken during a first period of time.

During a second period of time, data may not be available. For instance, the red light pulses are not detected due to a blocked light source. This may occur when an object is placed on an image-reading device, thus blocking the red light pulses from being captured by the imager. In this case, the latest measured value is used, such as that taken during the first period of time. That is, the image-reading device continues to activate the imager and the red light source using the same phase previously synchronized during the first period of time when the red light source was not blocked. An illustration of missing data due to not detecting the red LED pulses at the photosensor during the second period of time is provided at box 426.

The wireless synchronization can also be beneficial when additional light sources are included with the image-reading device. The additional light sources may be used to illuminate an area to capture images of objects under different light conditions. As such, it may be beneficial to activate each of the light sources at a different time or phase. For instance, a white light source may be included and used in combination with color imagers to capture images suitable for the identification of certain objects.

In this particular example, the top-down reader includes a white light source, for instance, a white LED. The white light source can be activated based on the illumination sequence provided at row 428. Here, the white light source is activated to emit white light pulses, such as white light pulses 430A-430N. Timing wise, the white light pulses follow the red light pulses shown in row 404. In some cases, the white light pulses immediately follow the red light pulses. The timing can be determined using the measured counter value of the FPGA clock so that the red light pulse timing is synchronized with the white light pulse timing, such that the white light source is activated and provides illumination after the red light source. Said differently, the synchronization described above between the imager of the top-down reader and the red light source of the base synchronizes the timing of the wireless, remote top-down reader and the base. Thus, the white light source of the top-down reader can be activated immediately after the red light source of the base based on this synchronization. By synchronizing the timing of the red and white light sources of the base and the top-down reader, the white light source can continue to be activated after the red light source, even when the light from the red light source is blocked, such as illustrated during the second period of time in FIG. 4. Thus, if an object is placed between the red light source on the base and the imager at the top-down reader, the white light source is still activated at the correct timing following activation of the red light source. This is done by following the previously measured values for timing synchronization, such as those values measured during the first period of time of FIG. 4. In synchronizing the light sources, images can be captured by one or more imagers during red illumination or white illumination. Where photosensors are used for the wireless synchronization, the timing may be synchronized between the base and the top-down reader using the red light source (or another light source) and the photosensor, such that the emission of the white light can follow emission of the red light as described.

As previously noted, FIG. 4 is intended to be one example of wireless timing synchronization between light sources of a base and a top-down reader. As such, specific values suitable for use, such as configuring the illumination to pulse at 80 Hz and the FPGA clock to measure light pulses at 2 MHz, have been provided. It is intended that these values not be limiting in any sense, and that other values could be suitable as well. It is not practical to describe every possibility. This is contemplated by the inventors, and as such, other suitable methods for wirelessly synchronizing light sources are intended to be within the scope of this disclosure. It is again reiterated that the wireless synchronization technique described with reference to FIG. 4 is only one example for a particular arrangement. The technique may be applied to other arrangements of one or more imagers and one or more light sources that are wirelessly remote. This includes techniques for synchronizing one or more monochrome imagers in any combination with one or more color imagers, along with one or more light sources of any color or combination of colors.

Figure 5:
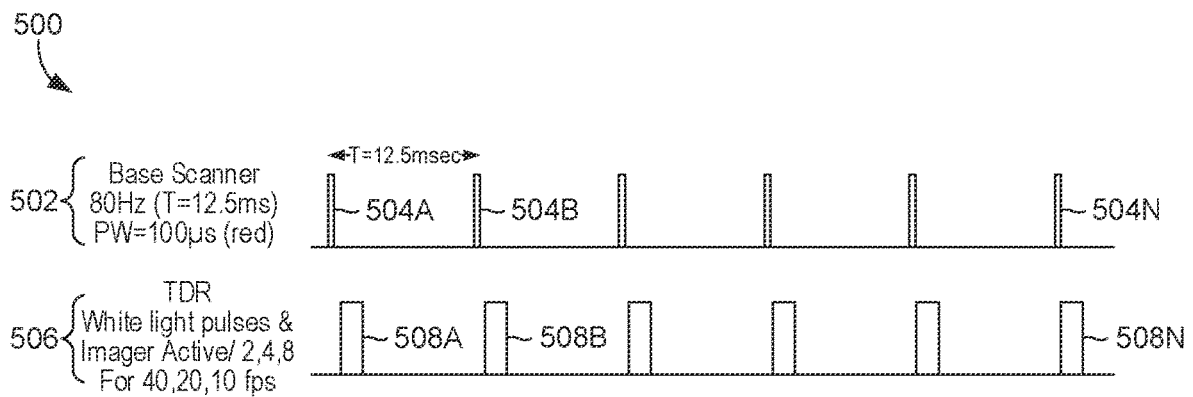
FIG. 5 is an example timing diagram for wired synchronization of light sources, in accordance with an aspect described herein.

Turning now to FIG. 5, the figure illustrates an example timing diagram 500 showing a method of wired timing synchronization between light sources of a base and a top-down reader. While this example uses light sources and imagers located at a base and top-down reader, it will be understood that the example method of wired synchronization of these components may be applicable between any imager or light source in wired communication, regardless of the particular arrangement within an image-reading device. In this example, since the light sources are in constant communication, the activation of the light sources can be performed by a controller programmed to activate the light sources and the imagers at particular frequencies and phases, and they will generally not drift out of synchronization.

In the example provided by FIG. 5, a base includes a red light source, such as a red LED. The red light source can be activated and pulsed by the controller at 80 Hz, which has a period of 12.5 msec. The pulse width (PW) is controlled and provided at 100 μs. This is just one example, and other PW durations may be used. The white light, emitted by the white light source, can be controlled by the controller and emitted after activation of the red light source. In this example, the white light source has the same period, but it is activated after activation of the red light source. The white light source may emit a white light pulse having a PW that is equal to, greater than, or less than the PW of the red pulse. Put another way, the controller can be programmed to activate a red light and a white light source, where the phase of the emitted red light pulses is offset the phase of the white light pulses. The controller can also be programmed to activate monochrome or color imagers during the time in which the red and white light pulses are emitted, respectively. In some implementations, such as optical-code reading, it can be beneficial to activate the red and white light sources simultaneously.

In the illustration provided by FIG. 5, row 502 of timing diagram 500 includes red light pulses, such as red light pulses 504A and 504B. The illustration provides an indefinite number of red light pulses, represented as red light pulses 504A through 504N. Row 506 includes white light pulses, such as white light pulses 508A and 508B. The illustration provides an indefinite number of white light pulses, represented as white light pulses 508A through 508N.

FIG. 5, too, is intended to be one example of wired timing synchronization between light sources of a base and a top-down reader. As such, specific values suitable for use, such as configuring the light sources to pulse at 80 Hz and having a PW of 1000 have been provided. It is intended that these values not be limiting in any sense, and other suitable methods for wired synchronization of light sources are intended to be within the scope of this disclosure.

Returning briefly to FIG. 3, multi-mode configuration engine 300 further comprises mode selector 304. Mode selector 304 generally selects an operational mode from among a plurality of operational modes.

While various operational modes are possible, three example operational modes from which mode selector 304 can select will be described in more detail. In general, however, mode selector 304 may select a mode based on an input from a user. That is, a signal received by the controller indicates a manual selection of an operational mode. In accordance with the input signal, mode selector 304 selects a particular mode of operation.

In an aspect, mode selector 304 changes a selected mode of operation to a different mode of operation. This can occur in response to a manual input signal, automatically in response to a particular selection event, or based on a pre-determined algorithm, further discussed below. In one example, mode selector 304 cycles through each operational mode in any order. In one case, mode selector 304 changes the selected mode of operation temporarily to a different operational mode, and after performing at least a portion of an illumination sequence or exposure sequence of the different operational mode, mode selector 304 changes the operational mode back to the original selected mode of operation. The change can be in response to a manual input or automatically following performance of the portion of the illumination sequence or exposure sequence. This can be beneficial when the application of the image-reading device changes during use.

In another implementation, mode selector 304 selects a mode based on the occurrence of a selection event. Selection events can include an intensity of ambient light compared to an illumination threshold, a speed of an object passing through an area over which the imager is configured to capture the image, an object weight of an object within the area, detection of an object by an object detector at the area, and the like.

For instance, a photosensor of an image-reading device detects an intensity of ambient light from light sources not included as part of the image-reading device. The controller is configured to have an illumination threshold. In one case, a selection event occurs if the ambient light is less than the threshold illumination value.

The speed of an object passing over an area is another example selection event that mode selector 304 may use to select a particular operational mode. The object passes through an area, which generally coincides with an area above the base of the image-reading device and over which an imager captures an image. The controller identifies a relative speed of the object based on the frame-by-frame location of the object as determined by the imager. A selection event can occur when the speed of the object is greater than a threshold speed value.

Another selection event can occur based on the image-reading device detecting a weight of an object. As noted, some image-reading devices include a scale. One location for the scale is the base of the image-reading device. The selection event occurs when the controller of the image-reading device receives a signal from the scale indicating an object weight applied to the scale. Some implementations of this compare the object weight to a threshold weight value and provide a triggering event when the object weight is greater than the threshold value. Another implementation determines a length of time the weight is applied and compares it to a timing threshold value. The selection event can occur when the length of time is equal to or greater than the threshold timing value.

Figure 7:
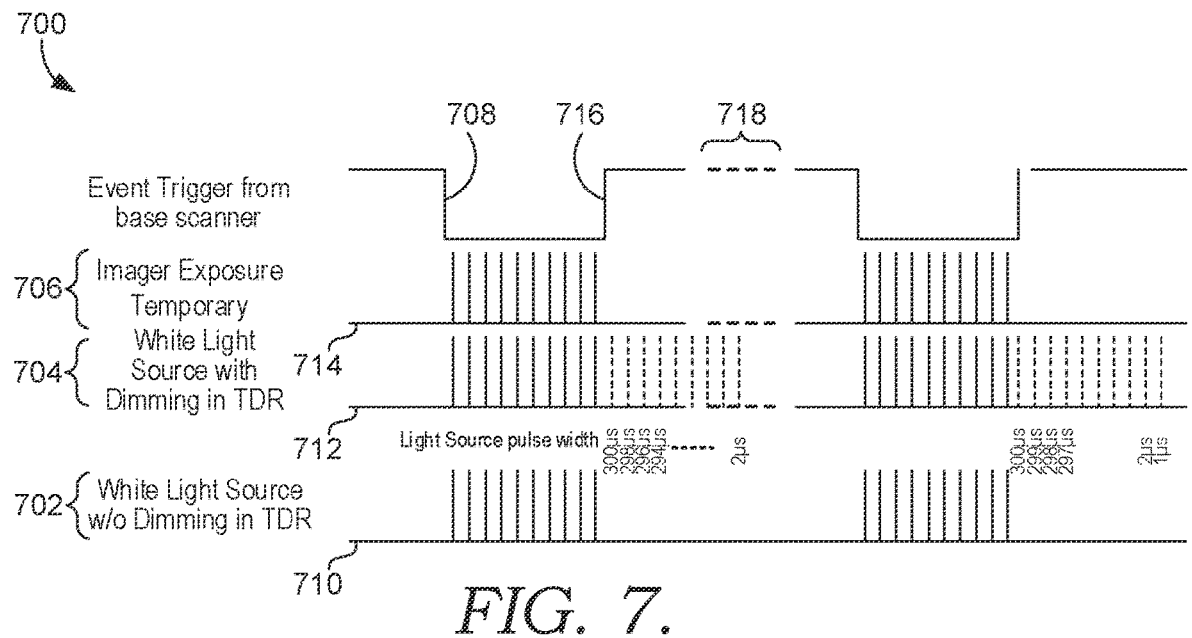
FIG. 7 is a timing diagram illustrating an example second operational mode, in accordance with an aspect described herein.
Figure 8:
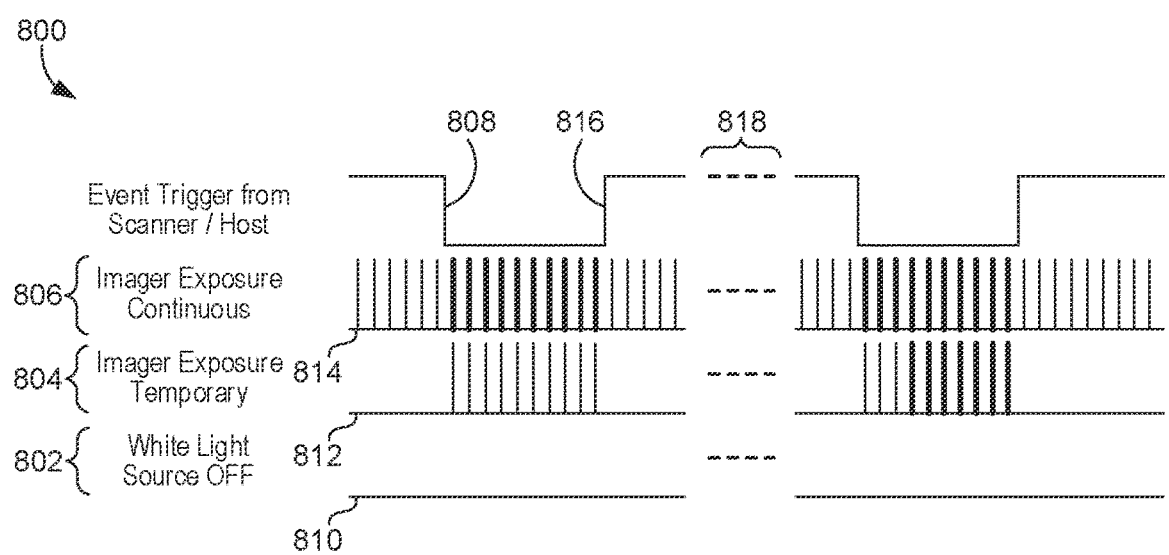
FIG. 8 is a timing diagram illustrating an example third operational mode, in accordance with an aspect described herein.

As noted, mode selector 304 selects an operational mode from a plurality of operational modes. Three operational modes are described as examples of potential operational modes from which mode selector 304 can select. These are illustrated in FIGS. 6-8.

The various operational modes may include triggering events. A triggering event is an occurrence that causes the controller to activate a light source or imager in a pattern corresponding to all or a portion of an illumination sequence or an exposure sequence that is defined by the operational mode. That is, each operational mode can define an illumination sequence having timing instructions for one or more light sources or an exposure sequence having timing instructions for exposures by one or more imagers. Some illumination sequences and exposure sequences provide for activation of a light source or imager upon the occurrence of the triggering event. In general, a triggering event may be any event. The selection events previously discussed may also serve as a triggering event. Thus, while the selection event and the triggering event may be the same event or different events, entirely, mode selector 304 uses the selection event to select a particular operational mode, while the controller uses the triggering event as an instruction to activate a light source or imager according to the selected operational mode.

In some aspects, a triggering event can be followed by a triggering event termination. One example of determining the triggering event termination is by predefining a number of images or a duration of time to result after the triggering event takes place.

Figure 6:
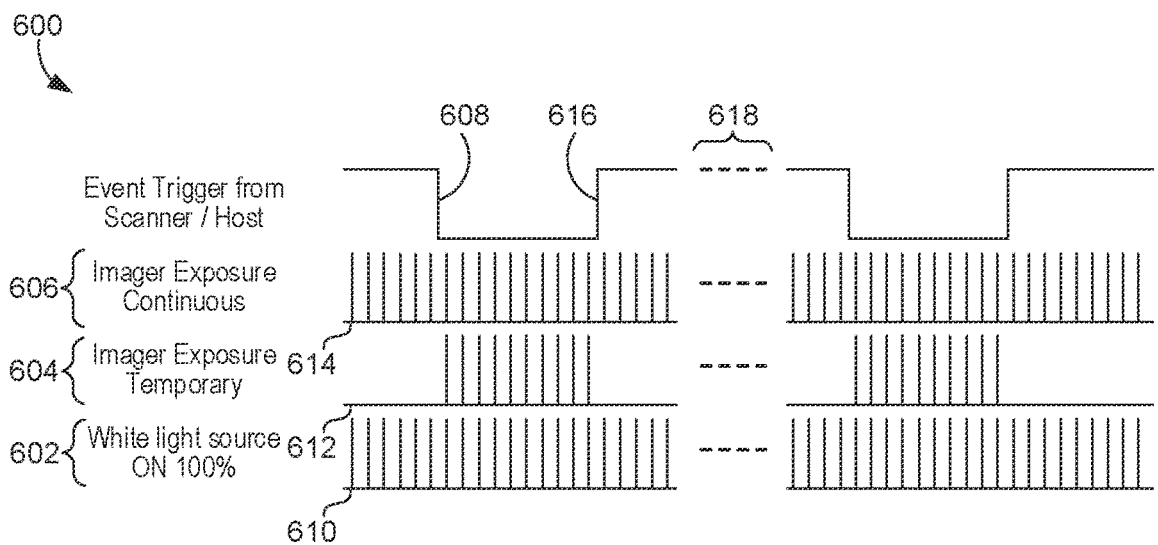
FIG. 6 is a timing diagram illustrating an example first operational mode, in accordance with an aspect described herein.

Turning to FIG. 6, an example timing diagram 600 of a first operational mode is illustrated. The first operational mode includes first illumination sequence 602, first temporary exposure sequence 604, and first continuous exposure sequence 606.

As illustrated in timing diagram 600, a triggering event, such as first triggering event 608, can occur during operation of an image-reading device. First illumination sequence 602 comprises continuous activation of a light source, such as a white LED light, before first triggering event 608. This is illustrated using first illumination pulse lines 610, which have pulse lines occurring prior to first triggering event 608. In some cases, such as in the example illustrated here, first illumination sequence 602 comprises continuous activation of the light source after first triggering event termination 616, illustrated by first illumination pulse lines 610 continually provided after first triggering event termination 616.

Timing diagram 600 of the first operational mode further includes first temporary exposure sequence 604. First temporary exposure sequence 604 comprises temporary activation of an imager of a camera (e.g., a color imager associated with the white light source) to capture an image. This is illustrated by first temporary exposure period lines 612 beginning at the same time, or about the same time, as first triggering event 608, continuing after first triggering event 608, and ending at the same time as, or about the same time as, first triggering event termination 616.

Timing diagram 600 of the first operational mode can have, as an alternative or additional embodiment, first continuous exposure sequence 606. For instance, the first operational mode may perform only continuous exposure, only temporary exposure, or both when there is more than one imager.

First continuous exposure sequence 606 comprises continuous activation of the imager before first triggering event 608. As illustrated in FIG. 6, timing diagram 600 comprises first continuous exposure period lines 614 that begin prior to first triggering event 608, continuous after first triggering event 608, and continue after first triggering event termination 616.

Timing diagram 600 further illustrates first set of ellipses 618. First set of ellipses 618 is provided to illustrate that first illumination sequence 602, first temporary exposure sequence 604, and first continuous exposure sequence 606 may continue indefinitely or continue until there is a change in the operational mode employed by the image-reading device.

The first operational mode may be beneficial when there is a desire for continuous or near-continuous image capture. One example location where this mode is particularly beneficial is in self-checkout lanes. The white light source can be continuous, as generally no single operator is standing at the lane for long periods of time. Further, the while light source serves to light the area so that customers can easily identify and use the self-checkout lane. Given the different illumination sequence scenarios, an imager can be used continuously to capture images and initiate triggering events or may be activated in response to another triggering event. Moreover, an advantage to using the temporary activation of the imager is that it reduces the data that the controller processes, since the data output is temporary following a triggering event, as opposed to the continuous imager activation aspects of the first operational mode.

With reference now to FIG. 7, an example timing diagram 700 of a second operational mode is illustrated. The second operational mode includes second illumination sequence 702, second dimming illumination sequence 704, and second exposure sequence 706.

Similarly, a triggering event, such as second triggering event 708, can occur during operation of an image-reading device operating in the second operational mode. Here, the second operational mode comprises second illumination sequence 702 having instructions for temporary activation of a light source, such as the white light source. As illustrated by timing diagram 700, the second operational mode comprises second illumination pulse lines 710 that begin at the same time, or about the same time, as second triggering event 708, continue after second triggering event 708, and end the same time, or about the same time, as second triggering event termination 716.

Timing diagram 700 further includes second dimming illumination sequence 704. The second operational mode may include second dimming illumination sequence 704, in addition to or without second illumination sequence 702. That is, the second operational mode may perform only second illumination sequence 702, perform only second dimming illumination sequence 704, or both when there is more than one light source.

As shown in FIG. 7, second dimming illumination sequence 704 provides for temporary activation of the light source, and further provides for a gradual decrease in intensity of the light, as illustrated by the second dimming illumination pulse lines 712 associated with PWs of 300 µs gradually decreasing to 2 µs. This rate is just one example and other decreasing rates of intensity can be used. Shown in second dimming illumination sequence 704, second dimming illumination pulse lines 712 begin at the same time, or approximately the same time as second triggering event 708 and continue after second triggering event 708. In this example, the PW of the light pulses is consistent after second triggering event until second triggering event termination 716. After second triggering event termination 716, the intensity of the emitted light is illustrated as decreasing using second dimming illumination pulse lines 712 that continue after second triggering event termination 716. In another sense, the intensity of the emitted light is constant during an exposure period, such as the exposure period of second exposure sequence 706, further discussed below, and gradually decreases in intensity after the exposure period.

Timing diagram 700 further illustrates second exposure sequence 706 of the second operational mode. Here, second exposure sequence 706 provides instructions for temporary activation of an imager to capture an image. As illustrated, second exposure period lines 714 begin at the same time, or about the same time, as second triggering event 708, continue after second triggering event 708, and end at the same time, or about the same time, as second triggering event termination 716.

In timing diagram 700, the second operational mode provides instructions for temporary activation of the light source that occurs simultaneously with the instructions for temporary activation of the imager.

Timing diagram 700 further illustrates second set of ellipses 718. Second set of ellipses 718 is provided to illustrate that second illumination sequence 702, second dimming illumination sequence 704, and second exposure sequence 706 may continue indefinitely or continue until there is a change in the operational mode employed by the image-reading device.

The second operational mode also has particular benefits for various applications and conditions. In particular, it is beneficial for attended lanes where there is an operator present who does not wish to be continuously exposed to the white light. It will be understood that, because the operational modes are configurable, the technology can be used for different applications and conditions. For instances, the first operational mode may be used when an image-reading device is used as self-checkout station. If desired, an operator may be posted at the image-reading device. When doing so, the operator may choose to change to the second operational mode so that the white light source is activated when needed, and not continuously emitting white light over the now-attended image-reading device.

Referencing now FIG. 8, another timing diagram 800 is provided to illustrate a third operational mode. Timing diagram 800 includes third illumination sequence 802, third temporary exposure sequence 804, and third continuous exposure sequence 806.

In this example, the third operational mode comprises temporary activation of a light source based on a triggering event and an intensity of ambient light. For instance, if the intensity of ambient light is above an illumination threshold, then there is no activation of the light. This is illustrated in FIG. 8 at third illumination sequence 802, showing no activation of the light, e.g., the white light source, based on third triggering event 808, as this presupposes the intensity of ambient light is greater than the illumination threshold. Where the intensity of ambient light is less than the illumination threshold, third illumination sequence 802 may appear the same as the temporary illumination sequences of FIGS. 6-7. Any illumination threshold may be used; however, one example illumination threshold that is suitable for use is about 500 Lux. Thus, where ambient light is measured at about 500 Lux or above, ambient illumination may be sufficient for image capture without active white light illumination.

Timing diagram 800 for the third operational mode further includes third temporary exposure sequence 804. Third temporary exposure sequence 804 comprises temporary activation of an imager to capture an image. This is illustrated by third temporary exposure period lines 812 beginning at the same time, or about the same time, as third triggering event 808, continuing after third triggering event 808, and ending at the same time as, or about the same time as, third triggering event termination 816.

Timing diagram 800 for the third operational mode can have, as an alternative or additional embodiment, third continuous exposure sequence 806. For instance, the third operational mode may perform only continuous exposure, only temporary exposure, or both when there is more than one imager.

Third continuous exposure sequence 806 comprises continuous activation of the imager before third triggering event 808. As illustrated in FIG. 8, timing diagram 800 comprises third continuous exposure period lines 814 beginning prior to third triggering event 808, continuing after third triggering event 808, and continuing after third triggering event termination 816.

Timing diagram 800 further illustrates third set of ellipses 818. Third set of ellipses 818 is provided to illustrate that third illumination sequence 802, third temporary exposure sequence 804, and third continuous exposure sequence 806 may continue indefinitely or continue until there is a change in the operational mode employed by the image-reading device.

FIG. 8 also illustrates some of the pulse lines associated with third temporary exposure sequence 804 and third continuous exposure sequence 806 in bold. These pulse lines have been found to have good grey scale and color corresponding to ambient conditions.

The third operational mode has benefits in that it might be used based on the present conditions of the image-reading device. That is, if there is enough ambient light, then the image-reading device is operating more efficiently and in a more user-friendly manner by not activating the white light. However, as noted, since the present conditions may change, the image-reading device can be configured to switch to a different operational mode depending on the ambient light conditions, such as the ambient light dropping to a level where it is more beneficial to have additional white light illuminating an area.

It will be understood that any and all combinations of the first through third operational modes is possible, and is intended to be within the scope of this disclosure. In one specific example, the gradual decrease of intensity of emitted light, illustrated in FIG. 7, can be applied to any of the operational modes. Further, while not shown, some aspects may include a gradual increase in intensity after a triggering event. Activation of an imager may occur after the gradual increase in intensity stops and the intensity of the emitted light is constant. It will be understood that gradually increasing the intensity may be used with any of the operational modes where there is a temporary activation of a light source. These embodiments are also intended to be within the scope of this disclosure.

In an aspect of the technology, mode selector 304 selects an operational mode having white illumination. Mode selector 304 selects the operational mode using the white illumination for object recognition.

In some cases, object recognition performs well when there is both ambient light and additional active illumination. This is because of the large volume coverage. When using both ambient light and an activate white light, automatic exposure control (AEC) is beneficial. For faster AEC, active illumination can be distributed over the whole exposure period (such as 10 msec).

In another aspect, when objects are swiped through the area, a narrow illumination pulse and exposure period can be used. One narrow illumination pulse example is 500 µs. Because of these scenarios, an image-reading device with real-time illumination and exposure control, such the image-reading devices described herein, is beneficial.

Two example methods that can be used to provide such lighting control are illustrated and described with reference to FIGS. 9A-B and FIG. 10. Using these methods, the image-reading device can provide the relatively faster pulses when objects are swiped through the area and longer pulses for object recognition.

Figure 9A:
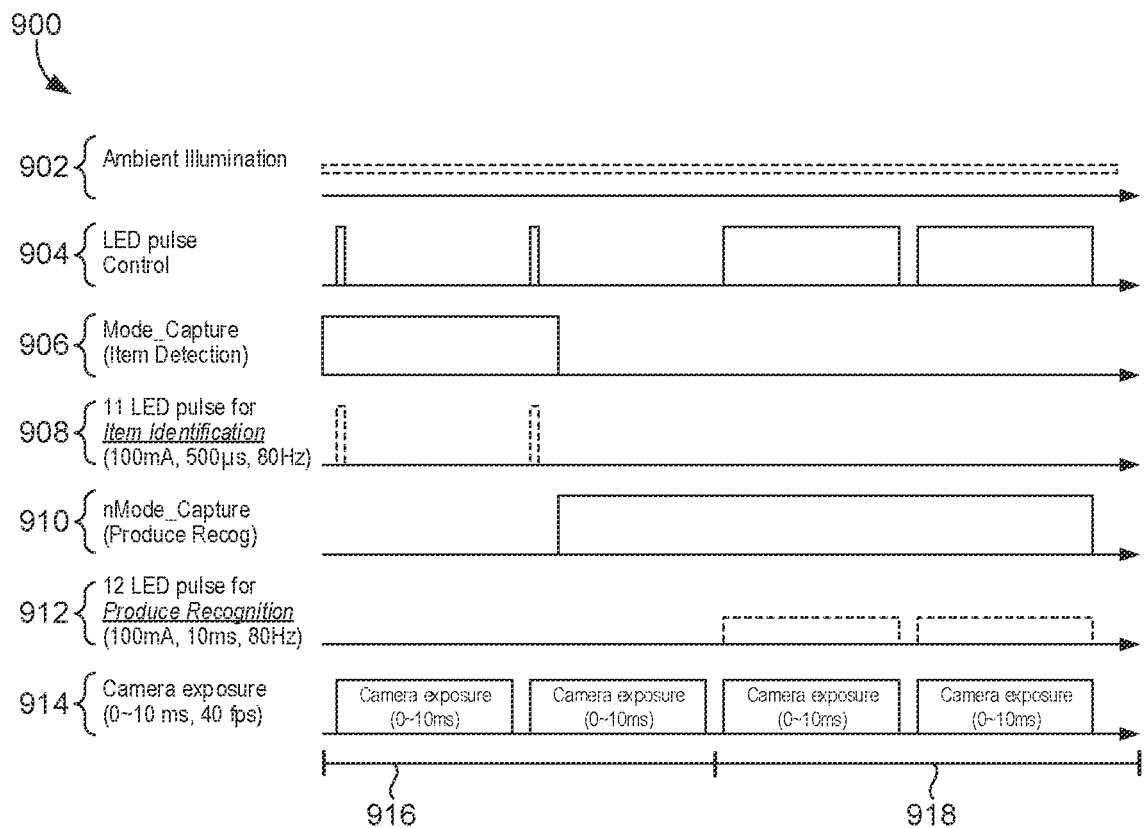
FIG. 9A is a timing diagram for providing different light pulses for different applications of an image-reading device, in accordance with an aspect described herein.
Figure 9B:
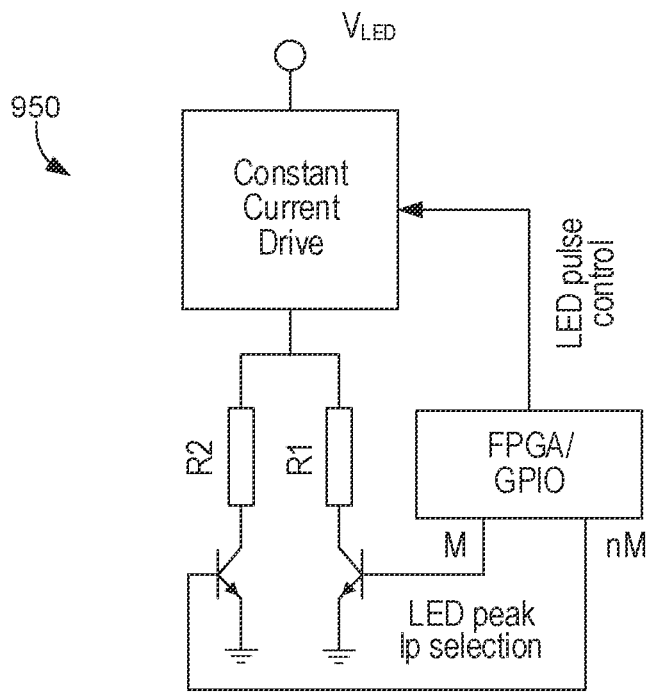
FIG. 9B is a circuit diagram of an example hardware device suitable for providing the different light pulses of FIG. 9A, in accordance with an aspect described herein.

FIG. 9A provides an example timing diagram 900 that uses hardware to provide more than one type of peak current, such as the hardware of FIG. 9B.

In timing diagram 900, ambient illumination is generally available at any given time, as illustrated in row 902. In some situations, the intensity of ambient light may vary.

As illustrated in row 904, a light source, such as an LED, can be controlled by the controller to pulse the light source. One example is to pulse the light at a frequency of 80 Hz. These relatively shorter pulses can be used during an item detection mode, as illustrated in row 906 during first portion of time 916. These shorter pulses can have a PW of 500 µs and be provided at 100 mA, for example.

Upon detecting an object over multiple pulses, as illustrated in row 908, the image-reading device switches to a product recognition mode, illustrated in row 910, where it provides longer pulses. An example of the longer product recognition pulse is provided at row 912. One example is to provide the longer pulses at the same frequency as the shorter pulses. Here, this is 80 Hz. The longer pulses may be provided with a PW that is greater than the shorter pulses. In this example, the longer pulses have a PW of 10 ms and are provided at 100 mA. This is illustrated at second portion of time 916.

The exposure sequence is provided at row 914. Here, the same exposure sequence can be provided for both object identification and object recognition, as illustrated at row 914. In this example, exposure periods are provided at or between 0 and 10 ms, at 40 fps.

By providing a constant exposure sequence for both object identification and object recognition, some aspects provide for only adjusting the light pulses, for instance, adjusting the light pulses from relatively shorter light pulses used for object identification and relatively longer light pulses used for object recognition, where more light is beneficial. This reduces the amount of light the operator is exposed to, and increases the efficiency of the image-reading device.

FIG. 9B provides circuit diagram 950 that is graphical representation of a hardware device sufficient for controlling the light sources to perform the sequences described in timing diagram 900. The device can be controlled through software through a logic device or processor I/O.

It can be beneficial to control the peak current of a light source in different scenarios. For instance, an image-reading device may use one type of pulse for capturing images of an object moved with speed. That is because a relatively shorter or more narrow PW can be used to capture an object moved with speed to reduce image blur that might occur with a relatively longer light pulse or imager activation. One example of a relatively shorter or more narrow PW that can be used in this scenario is about 100 μs. To achieve this, the light pulse, e.g., LED pulse, can use a peak current of about 1000 mA. In another scenario, items or objects undergo a longer exposure time, which can occur when an object is placed or rested within the field of view of an imager. Here, the light PW, such as an LED pulse, is activated over an exposure time of about equal to or between 1 and 10 ms. In some cases, a peak current of about 1000 mA can damage the light source. In this scenario, it may be beneficial to reduce the peak current. FIG. 9B provides an example hardware device for achieving these currents, which can be used to implement the illumination sequences and exposure sequences of FIG. 9A. The peak currents can be switched by controlling the M and nM shown in FIG. 9B. By controlling signal M and nM, the peak current can be switched from a relatively higher peak current to the relatively lower peak current.

Figure 10:
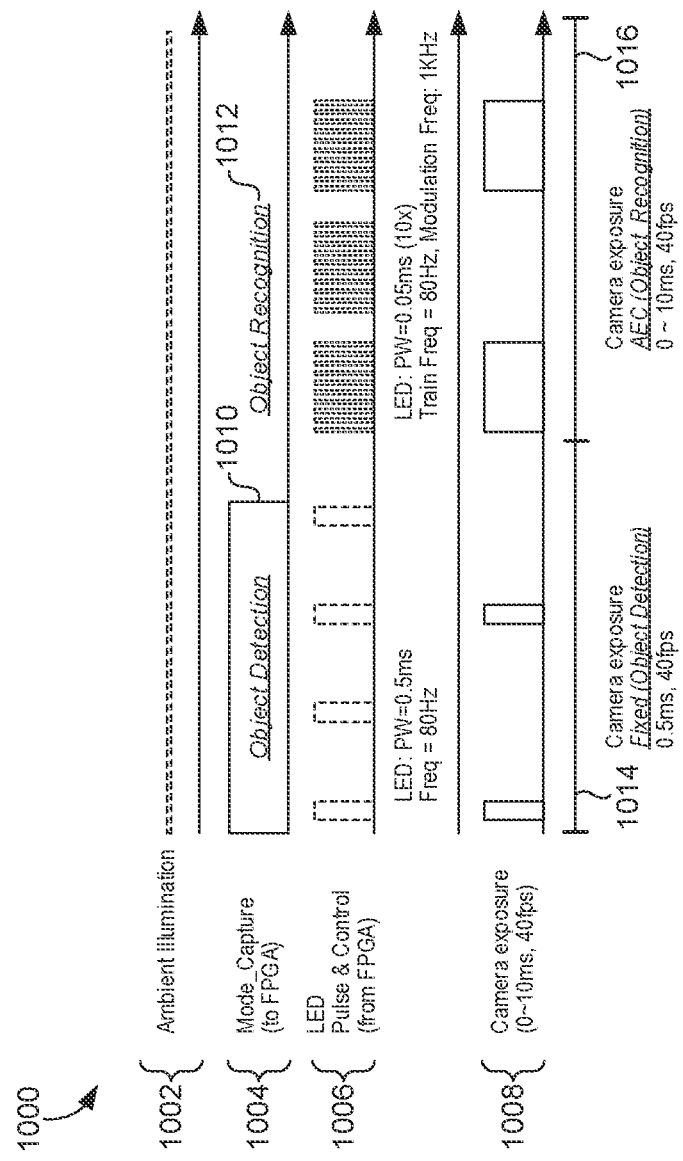
FIG. 10 is a timing diagram illustrating a software process for providing different light pulses for different applications of an image-reading device, in accordance with an aspect described herein.

FIG. 10 illustrates another example timing diagram 1000. In general, timing diagram 1000 illustrates a software process for performing an illumination sequence and exposure that can be used for object detection and object recognition. As previously discussed, there are benefits to providing short pulses of light vs providing longer pulses of light based on the application of the image-reading deice, such as scanning a moving object or object recognition. In some cases, using the software process allows an image-reading device to perform the illumination sequence without the need for additional hardware. That is, in this particular example, rather than use additional hardware to switch the peak current, a controller is configured to spread multiple pulses across a duration of time, rather than widening the light pulse and lowering the peak current. This also has the added benefit of increasing the speed of the AEC algorithm.

As shown in FIG. 10, generally, ambient light is available, although the intensity of the ambient light may vary. This is illustrated at row 1002. For image capture using a software method, an FPGA is configured to provide object detection and object recognition, as illustrated in row 1004, where object detection 1010 and object recognition 1012 are performed over first portion of time 1014 and second portion of time 1016, respectively.

During first portion of time 1014 over which object detection 1010 is performed, the FPGA is configured to pulse a light source, such as an LED. During object detection 1010, the FPGA can be configured to provide a relatively shorter pulse than when performing object recognition 1012. For instance, when performing object detection 1010, FPGA could be configured to pulse the light source at 80 Hz with a PW of 0.5 ms.

During second portion of time 1016, over which object recognition 1012 is performed, the FPGA is configured to pulse the light source at relatively longer pulses. In some aspects, such as the one illustrated in FIG. 10, each individual light pulse is shorter; however, the light appears to be active for a longer time because the frequency is modulated to a higher frequency. For instance, in the example shown, FPGA is configured to pulse a light source to have a PW of 0.05 ms. This is performed ten times. The illumination control is further provided by the pulse train frequency at 80 Hz, modulated to 1 KHz Returning to FIG. 3, having selected an operational mode, multi-mode configuration engine 300 can use light activator 306 and imager activator 308 to activate a light source and an imager.

In general, light activator 306 activates one or more light sources in a pattern that corresponds to an illumination sequence of an operational mode. Light activator 306 may activate lights using a driver, such as illumination driver 216 discussed with reference to FIG. 2. As noted, an illumination sequence may provide instructions for activation of the light, such as timing, PW, frequency, intensity, and the like. Light activator 306 provides a signal to a light source in accordance with the illumination sequence, such that the light source activates to emit light in response to the signal.

Imager activator 308 generally operates to activate an imager of a camera to capture an image. Imager activator 308 activates one or more imagers in a pattern corresponding to an exposure sequence provided by an operational mode. An imager may be activated when receiving image information from the imager. The image information is provided from the imager as a signal based on light focused onto the imager from a lens. In one implementation, activation of the imager includes opening an aperture using a mechanical or digital shutter to allow light to focus on the imager, thereby permitting a corresponding signal from the imager to the controller. In another implementation, activation of the imager includes receiving the imager information at the controller for an instant or duration of time.

Figure 11:
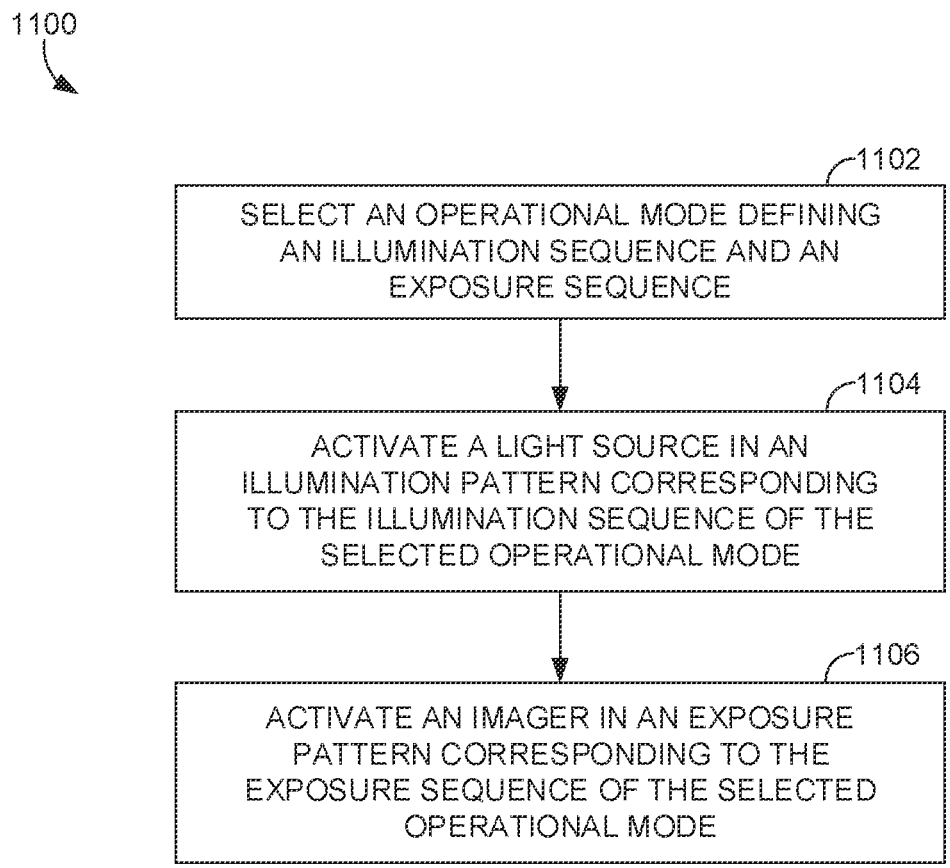
FIG. 11 is a block diagram illustrating an example method of multi-mode illumination and image capture using an image-reading device, in accordance with an aspect described herein.

With reference now to FIG. 11, a block diagram is provided to illustrate method 1100 for performing multi-mode illumination and image capture. In embodiments, one or more computer storage media having computer-executable instructions embodied thereon that, when executed, by one or more processors, causes the one or more processors to operations of method 1100. In an aspect, a controller of an image-reading device performs parts of the method.

At block 1102, an operational mode is selected. The operational mode can include an illumination sequence and an exposure sequence. The operational mode can be selected by mode selector 304. The operational mode may be selected based on a selection event, including a manual request for a particular mode or an automatic selection of a mode based on the selection event, such as an intensity of ambient light, the speed of an object, an object weight, or a predetermined algorithm. The operational mode may define an illumination sequence for one or more light sources at any location of an image-reading device. The operational mode may define an exposure sequence for one or more imagers at any location of the image-reading device.

At block 1104, a light source is activated. The light source can be activated by light activator 306. One or more light sources can be activated at any location on the image-reading device. The light source can be activated in a pattern corresponding to the illumination sequence of the selected operational mode. Light activator 306 may activate a light source in accordance with the illumination sequence based on a triggering event.

At block 1106, an imager is activated. Imagers can be activated by imager activator 308. One or more imagers at any location on the image-reading device can be activated. The imager is activated in an exposure pattern corresponding to the exposure sequence of the selected operational mode. Imager activator 308 may activate an imager in accordance with the exposure sequence based on the triggering event.

Illumination Scheme for Capturing Monochrome, Color, and Ambient Light Images

As previously described, another aspect of the technology that improves upon conventional image-reader devices provides for a light pulse sequence that takes advantage of red light, white light, and ambient light. The light pulse is provided in a repeating pattern, where each pulse sequence may include a combination of red, white, and ambient light. The pulses can be provided at a frequency rate that does not permit the human eye to perceive the individual pulses or the various light provided by the different pulses. Imagers can be activated across various locations of an image-reading device that are timed according to a specific wavelength or light color within the pulse. For instance, a particular imager may be activated with a particular light source, such as color image sensors with white illumination sources and monochrome sensors with red illumination sources. Thus, different images can be captured of an object by different imagers using various lighting without having to change the lighting pattern that the operator experiences.

Taking images using various wavelengths of light is beneficial, as some wavelengths, e.g., some colors schemes, are better for particular applications. For instance, red light is good for quick reading of optical codes or object detection within an area, and red light itself is not harshly perceived by an operator. A short white light pulse, or more generally multi-spectrum light pulses, can also be used for optical code reading. A longer white light pulse is beneficial for object recognition. Ambient light is beneficial for reading objects that are reflective or glossy, such as a clear plastic or the screen of a mobile device.

Figure 12:
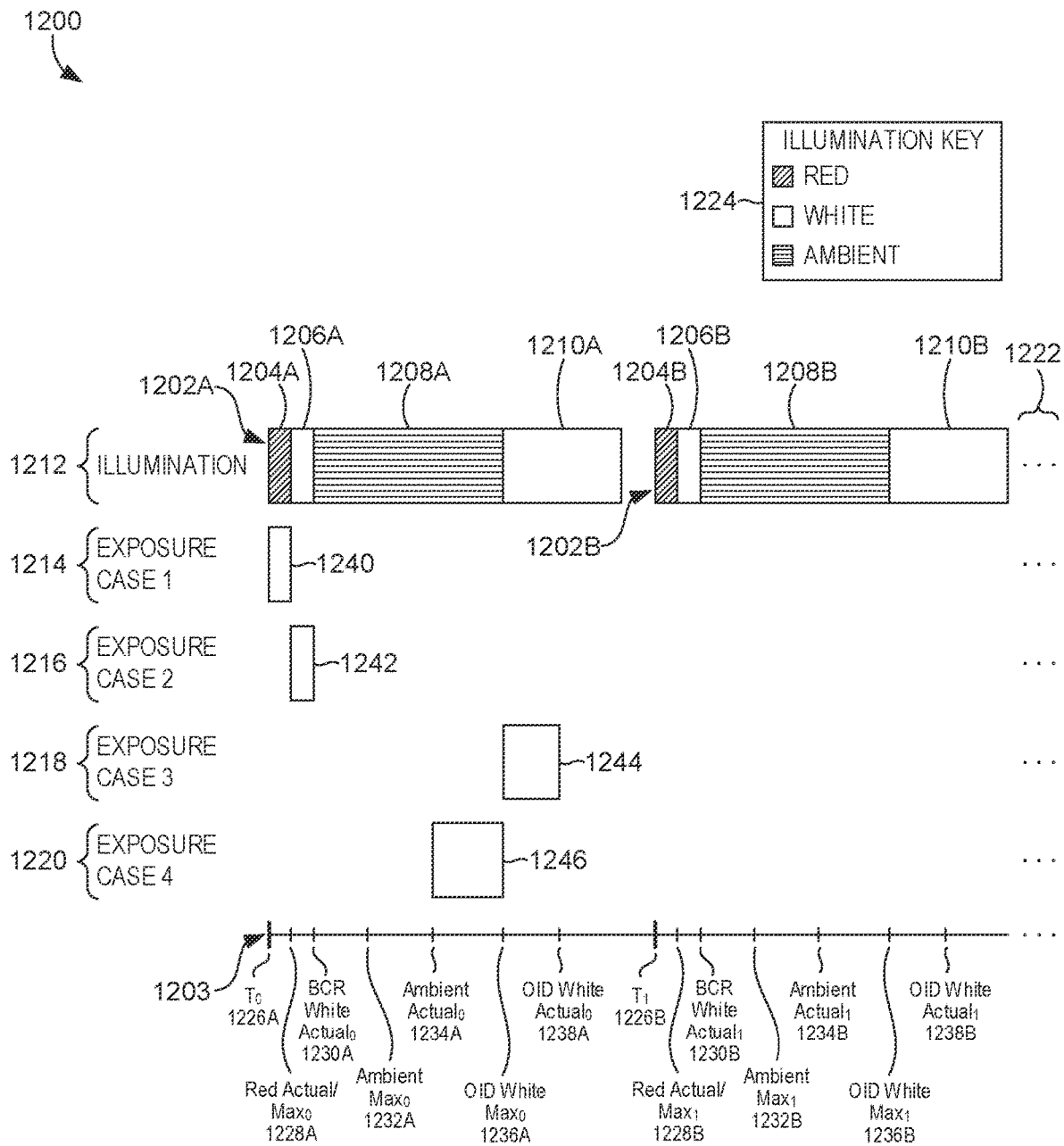
FIG. 12 is a timing diagram illustrating a repeating series of light pulses and exposure periods, in accordance with an aspect described herein.

FIG. 12 provides timing diagram 1200 illustrating a repeating series of light pulses and exposure periods. In timing diagram 1200, each light pulse is formed of different wavelengths or colors, including red, white, or ambient light. As illustrated in FIG. 12, timing diagram 1200 includes row 1212 that illustrates light pulses 1202A and 1202B extending forward in time from left to right, as illustrated on axis 1203.

As will be further discussed, timing diagram 1200 also illustrates four cases of exposure timing. Row 1214 illustrates exposure case one. Row 1216 illustrates exposure case two. Row 1218 illustrates exposure case three. Row 1220 illustrates exposure case four. Each of the exposure cases provides an exposure sequence indicating the activation of an imager during an exposure period, as will be further discussed.

Both the light pulses and the exposure cases are illustrated as a repeating series using set of ellipses 1222.

Regarding light pulses 1202A and 1202B, each light pulse includes a sequence of red, white, and ambient light, as illustrated in light pulses 1202A and 1202B, using illumination key 1224. The sequence provided by light pulses 1202A and 1202B is an example. It will be understood that other sequences may be formed using red, white, and ambient light. Such sequences are intended to be within the scope of this disclosure.

In general, an image-reading device may form light pulses by activating light sources in a specific pattern. Thus, to form light pulses 1202A and 1202B, a red light source is activated for specified amount of time. This forms red portion 1204A, extending from $T_0$ 1226A to red actual/$max_0$ 1228A. The image-reading device stops activation of the red light, e.g., deactivates the red light, at time red actual/$max_0$ 1228A.

At time red actual/$max_0$ 1228A, image-reading device activates a white light source for a specified amount of time. Here, the white light source is active over time red actual/$max_0$ 1228A to time BCR (Barcode Reading) white actual$_0$ 1230A, when image-reading device stops activation of the white light source. This forms first white portion 1206A.

To form ambient portion 1208A, image-reading device may not activate another light source during time BCR white actual$_0$ 1230A to OID (object identification) white $max_0$ 1236A. Thus, in effect, light pulse 1202A includes ambient portion 1208A, extending from time BCR white actual$_0$ 1230A to OID white $max_0$ 1236A. Ambient portion 1208A can be greater than, e.g., have a longer duration than, second white portion 1210A.

At time OID white $max_0$ 1236A, the white light source is activated to form second white portion 1210A. Activation of the white light is stopped at or prior to time $T_1$ 1226B, forming second white portion 1210A.

In an example reduced to practice, red light illumination to form red portion 1204A occurs for about 100 μs; white light illumination to form first white portion 1206A occurs for about 100 μs; no illumination to allow for ambient portion 1208A occurs for about 6 ms; and white light illumination to form second white portion 1210A occurs for about 3 ms. In an example where red light pulses 1202A and 1202B are pulsed at a frequency of 80 Hz, the total time duration of red portion 1204A, first white portion 1206A, ambient portion 1208A, and second white portion 1210A may be equal to or less than 12.5 ms.

The sequence having red portion 1204A, first white portion 1206A, ambient portion 1208A, and second white portion 1210A can be repeated. One method of repeating this sequence is to activate the red and white light sources at the same frequency. It may be beneficial to use frequencies above 60 Hz so that a human operator does not perceive flashing. For most people, frequencies above 60 Hz will blend together, making the light pulses less bothersome, and it's more likely that the operator will acclimate to, what is perceived as, a fluid light pattern. In one example, 80 Hz is used to time the activation of the lights. In doing so, the sequence is repeated, as illustrated in light pulse 1202B, having red portion 1204B, first white portion 1206B, ambient portion 1208B, and second white portion 1210B. As illustrated by set of ellipses 1222, the pulses are repeated having this sequence. In one example, the time from $T_0$ 1226A to $T_1$ 1226B is about 16 ms, which can be used with a 60 Hz frequency. In another example, the time from $T_0$ 1226A to $T_1$ 1226B is about 12 ms, which can be used with an 80 Hz frequency.

As illustrated, light pulses 1202A and 1202B respectively include first white portion 1206A and second white portion 1210A, and first white portion 1206B and second white portion 1210B. When activating the white light source to form the white portions, the white light source can be activated to have a gradual increase in intensity or gradual decrease in intensity. Any combination of these can be performed in this sequence. That is, first white portions 1206A and 1206B can include a gradual increase in intensity, a gradual decrease in intensity, or both. Similarly, second white portions 1210A and 1210B can include a gradual increase in intensity, a gradual decrease in intensity, or both. Any and all combinations are contemplated. Moreover, the gradual increase may occur prior to or at the activation times indicated. That is, when occurring prior the activation time, the intensity of the white light can be increased until constant at the activation time. Similarly, the gradual decrease can begin prior to or at the times indicated for stopping activation of the white light. Any and all combination are contemplated and are intended to be within the scope of this disclosure.

One benefit of placing ambient portion 1208A between first white portion 1206A for BCR white illumination and second white portion 1210A for OID white illumination allows exposures to aggregate both white and ambient in one imager exposure. For instance, first white portion 1206A may grow into ambient portion 1208A. Similarly, second white portion 1210A would grow "backwards" into ambient portion 1208A. The combination of white and ambient light allows good visibility of the object in question (due to the white illumination) and good visibility of the surrounding scene (due to the presence of ambient light, e.g. ambient "illumination").

Further, one or more of red light sources and one or more of white light sources can be used to form the repeating series. Each of these light sources can be located anywhere on the image-reading device. For instance, a red light source can be located at a horizontal portion of a base, a vertical portion of the base, or at a top-down reader. Likewise, a white light can be located at the horizontal portion of a base, the vertical portion of the base, or at the top-down reader. All combinations are intended to be within the scope of this disclosure. In one specific embodiment, a red light source is located at the base, and a white light source is located at the top-down reader and emits white light over an area of the base.

As previously described, the image-reading device can have one or more imagers positioned at any location, including imagers located in the base and imagers located in the top-down reader. In an aspect, each imager can be configured, or utilized, to capture an image for a specific application. For instance, an imager may be activated for an exposure period to capture an image during a specific portion of a light pulse, such as light pulses 1202A and 1202B.

Some example exposure sequences for imager activation are illustrated in timing diagram 1200, and are provided as exposure cases one through four.

At row 1214, case one provides for a first imager activation over exposure period 1240 from time $T_0$ 1226A to time red actual/max$_0$ 1228A. First exposure period 1240 may coincide with red light activation that forms red portion 1204A. In an example, first exposure period 1240 is about 100 μs. A dedicated imager located on the base or the top-down reader of the image-reading device can be activated during the first exposure period 1240. This imager can be used to return an image for reading a barcode, such as paper barcode or another barcode not presented on a display device or a glossy surface. The image from this imager can also be used for Digital Water Mark (DWM) reading.

At row 1216, case two provides for a second imager activation over second exposure period 1242 from time red actual/max$_0$ 1228A to time BCR white actual$_0$ 1230A. Second exposure period 1242 may coincide with white light activation that forms first white portion 1206A. In an example, second exposure period 1242 is about 100 μs. A dedicated imager located on the base or the top-down reader of the image-reading device can be activated for second imager activation during second exposure period 1242. This imager can be used to return an image for reading a barcode, such as paper barcode or another barcode not presented on a display device or a glossy surface. The image from this imager can also be used for monochrome DWM reading. The image can also be used for color image capture used for security and object identification.

At row 1218, case three provides for a third imager activation during third exposure period 1244 from time OID white max$_0$ 1236A to time OID white actual$_0$ 1238A. Third exposure period 1244 may coincide with all or a portion of white light activation that forms second white portion 1210A. In an example, third exposure period 1244 is at or less than 3 ms. In an aspect, third exposure period 1244 is about 1.5 ms. In another aspect, third exposure period 1244 is about 1 ms. A dedicated imager located on the base or the top-down reader of the image-reading device can be activated for the third imager activation during third exposure period 1244. This imager can be used for color image capture for security and object identification. In particular, the relatively longer exposure period during active illumination of white light is beneficial for object recognition, and as such, the image returned from the third imager activation is generally suitable for object recognition.

At row 1220, case four provides for a fourth imager activation during fourth exposure period 1246 from time ambient actual$_0$ 1234A to time OID white max$_0$ 1236A. Fourth exposure period 1246 may coincide with all or a portion of ambient portion 1208A. In an example, fourth exposure period 1246 is about 1 ms. A dedicated imager located on the base or the top-down reader of the image-reading device can be activated for the fourth imager activation. This imager can be used to capture an image for reading optical codes on reflective or glossy surfaces, or those displayed on a display device of a mobile device.

In general, imagers, such as those described with reference to cases one through four, are activated to capture an image in repeating series. This is illustrated using set of ellipses 1222. One example method for activating imagers is to activate each imager using the same frequency, adjusted by the timing to correspond with a particular portion of the light pulses over which the image is configured to activate. In this way, the frequencies under which the imagers are activated, i.e., the framerate frequency of the imager, are offset from one another. That is, the frequency of each imager is the same, while the exposure period of the imager occurs during a different time of each frequency cycle.

The imagers can be configured to activate at a frequency half that of the frequency used for the illumination. That is, the illumination frequency is two times the framerate frequency of the imagers. For example, if the frequency for activating the light sources is provided at 80 Hz, then the frequency for imager activation can be configured to 40 Hz. Likewise, if the frequency for activating the light sources is provided at 60 Hz, then the frequency for imager activation can be configured to 30 Hz. Thus, imagers would activate for every second light pulse. As illustrated, in timing diagram 1200, no imager activation is shown associated with light pulse 1202B. However, the imager activation provided by cases one through four would also occur for the light pulse following light pulse 1202B, and so on for every other light pulse.

In some cases, light sources and imagers are located in different locations of the image-reading device, including the base and a top-down reader. To provide the light pulses and activate the imagers at different times, the various light sources and imagers can be synchronized. Previously discussed synchronization methods can be used.

Any combination of cases may be used when operating the image-reading device. For instance, case one can be used with any combination of cases two through four, and case two could be used with any combination of cases one, three, and four, and so forth. Each case may be used alone or in use with one additional case, two additional cases, or all three.

While cases one through four of timing diagram 1200 are discussed and illustrated in a particular order, no specific order of imager activation as part of the various cases is implied. In operation, any exposure order using more than one imager can be performed. In another example, a portion of the imagers are activated during a first light pulse, while another portion is activated during a second light pulse, and each of the activated imagers continues to be activated every other light pulse. The first portion and second portion are activated offset by one light pulse.

In an aspect of the technology, the repeating pulse sequence is used in conjunction with multi-mode illumination and image capture, which has been previously discussed. For instance, repeating pulse sequences, such as those provided in timing diagram 1200 and previously discussed, may be used with any of the operational modes when using a multi-mode configuration of the image-reading device.

Figure 13:
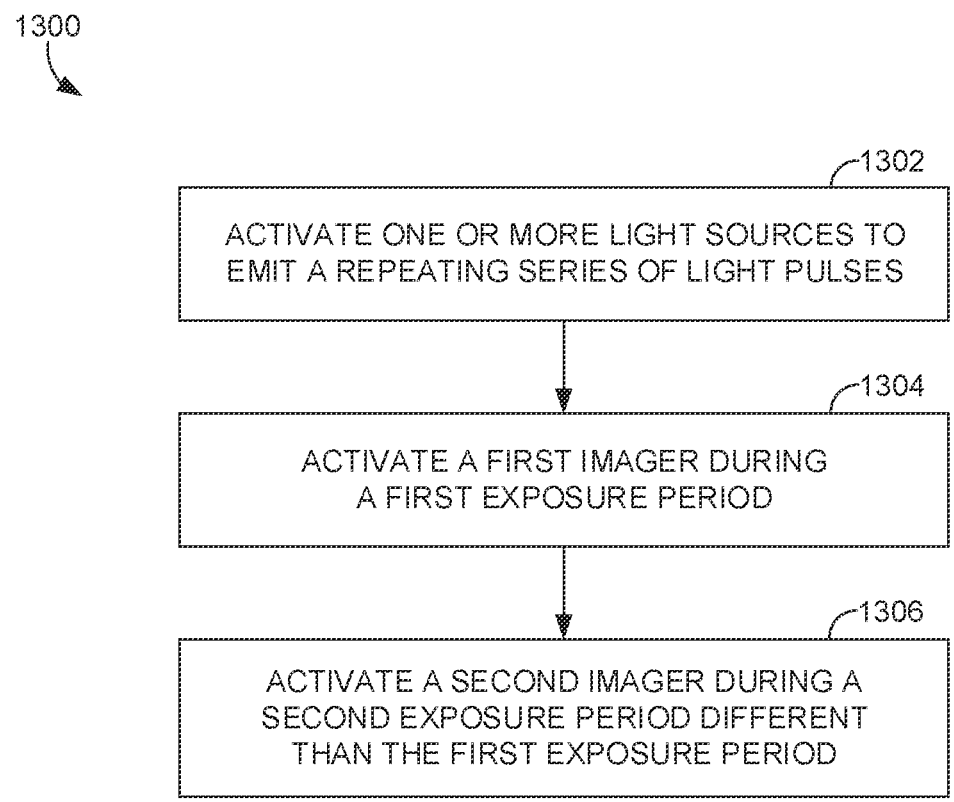
FIG. 13 is a block diagram illustrating an example method for performing illumination and exposure using a repeating series of light pulses, in accordance with an aspect described herein.

With reference now to FIG. 13, a block diagram is provided to illustrate method 1300 for performing illumination and exposure using a repeating series of light pulses having a sequence of red, white, an ambient light. In embodiments, one or more computer storage media having computer-executable instructions embodied thereon that, when executed, by one or more processors, cause the one or more processors to perform operations of method 1300. In an aspect, a controller of an image-reading device performs operations of the method.

At block 1300, one or more light sources are activated to emit a repeating series of light pulses. The repeating series of light pulses may comprise portions of red and white active illumination and a portion of ambient light. In a specific example, each of the pulses includes a first portion of red light, a second portion of white light, a third portion of ambient light, and a fourth portion of white light. The second portion of white light and the fourth portion of white light can be separated by the third portion of ambient light. In cases, the first portion of white light can be provided with a shorter PW than the third portion of white light. Each of the red and white light portions of the light pulses may be emitted by different light sources. In some cases, the white light portions are emitted by the same or a different white light source.

At block 1304, a first imager is activated during a first exposure period. The first exposure period may occur during emission of the red light, white light, or ambient light. That is, the first exposure period may occur during the first portion of red light, the second portion of white light, the third portion of ambient light, or the fourth portion of white light.

At block 1306, a second imager is activated during a second exposure period. The second exposure period is different from the first. The second exposure period may be offset from the first exposure period. That is, the first exposure period and the second exposure period can be provided at the same frequency, while each repeatedly occurring at a different time. For instance, the first exposure period may coincide with any of the red light, white light, or ambient light portions, while the second exposure period coincides with any of the red light, white light, or ambient light portions that are different from the portion coinciding with the first exposure period.

This may continue for any number of imagers and exposure periods. For instance, a third imager could be activated during a third exposure period. The third exposure period is different from the first exposure period and the second exposure period. The third exposure period can be offset from the first exposure period and the second exposure period. The third exposure period can coincide with any of the red light, white light, or ambient light portions different from the portions coinciding with the first and second exposure periods. This can continue any number of times. One benefit of a third imager and a third exposure period is that, collectively, the three imagers can capture an image under each of the different conditions, e.g., red, white, and ambient lighting conditions. In effect, this allows a nearly instant mechanism to capture an image that can be used for three different applications without the operator having to engage in multiple scans, while at the same time, providing a single light type and sequence from the perspective of the operator.

CONCLUSION

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

Words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

The use of the term "about" throughout this disclosure means ±10%.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

Some example aspects of the technology that may be practiced from the forgoing disclosure include the following:

Aspect 1: A computerized method of multi-mode illumination and image capture, the method comprising: receiving an input signal in response to a trigger event, the input signal identifying an operational mode from a plurality of operational modes, the operational mode being determined based on the trigger event, each operational mode defining an illumination sequence and an exposure sequence; activating a light source in an illumination pattern corresponding to the illumination sequence of the identified operational mode; activating an imager to capture an image, the imager activated in an exposure pattern corresponding to the exposure sequence of the identified operational mode.

Aspect 2: Aspect 1, wherein the trigger event is based on an intensity of ambient light, and wherein the operational mode provides for activation of the light source based on the light source emitting white light, the operational mode being determined based on the intensity of ambient light compared to illumination threshold.

Aspect 3: Any of Aspects 1-2, wherein the event trigger is based on a speed of an object moving through an area from which the image is captured.

Aspect 4: Any of Aspects 1-3, wherein activating the light source further comprises gradually increasing an intensity of light emitted from the light source and gradually decreasing the intensity of the light emitting from the light source.

Aspect 5: Any of Aspects 1-4, wherein the exposure sequence comprises imager activation over a first period of time and the illumination sequence comprises light source activation over the first period of time, the illumination sequence further comprising gradually decreasing an intensity of light emitted from the activated light source over a second period of time following the first period of time.

Aspect 6: An image-reading device for multi-mode illumination and image capture comprising: a first light source; a first imager configured to capture an image of an area; and a controller comprising at least one processor and computer storage media, the computer storage media having store thereon computer-readable instructions that, when executed by the at least one processor, cause the at least one processor to: select an operational mode defining an illumination sequence and an exposure sequence; activate the first light source in an illumination pattern corresponding to the illumination sequence of the selected operational mode; and activate the first imager in an exposure pattern corresponding to the exposure sequence of the selected operational mode.

Aspect 7: Aspect 6, wherein the operational mode is selected from: a first operational mode comprising a first illumination sequence having continuous activation of the first light source before a first triggering event and a first exposure sequence having continuous activation of the first imager before the first triggering event; a second operational mode comprising a second illumination sequence having temporary activation of the first light source after a second triggering event and a second exposure sequence having temporary activation of the first imager after the second triggering event; and a third operational mode comprising a third illumination sequence having temporary activation of the first light source after a third triggering event and based on an intensity of ambient light, and a third exposure sequence having temporary activation of the first imager after the third triggering event.

Aspect 8: Any of Aspects 6-7, wherein temporary activation of the first light source after the third triggering event of the third operational mode is based on the intensity of ambient light detected by the image-reading device being less than an illumination threshold.

Aspect 9: Any of Aspects 6-8, further comprising a base, wherein the first light source is a top-down light source configured to emit light proximate the base, and wherein the area corresponds to the base and the first imager is configured to capture the image of the area corresponding to the base.

Aspect 10: Any of Aspects 6-9, further comprising a second light source and a second imager, the first light source configured to emit red light, the second light source configured to emit white light, the first imager being a monochrome imager, the second imager being a color imager, wherein the controller activates the first light source to emit red light while simultaneously activating the monochrome imager, and wherein the controller activates the second light source to emit white light while simultaneously activating the color imager.

Aspect 11: Any of Aspects 6-10, further comprising synchronizing the first light source with the first imager by maximizing a time during which the first imager detects light emitted by the first light source.

Aspect 13: Any of Aspects 6-12, wherein the time is maximized by adjusting a phase of the first light source or the first imager.

Aspect 14: Computer storage media having stored thereon computer-readable instructions that, when executed by a processor, cause the processor to perform operations of multi-mode illumination and image capture, the operations comprising: selecting an operational mode for a light source of an image-reading device from among a plurality of operational modes, each operational mode defining an illumination sequence for the light source and an exposure sequence for an imager, the plurality of operational modes including: a first operational mode comprising a first illumination sequence having continuous activation of the light source before a first triggering event and a first exposure sequence having continuous activation of an imager before the first triggering event; a second operational mode comprising a second illumination sequence having temporary activation of the light source before a second triggering event and a second exposure sequence having temporary activation of the imager after the second triggering event; and a third operational mode comprising a third illumination sequence having temporary activation of the light source after a third triggering event and based on an intensity of ambient light, and a third exposure sequence having temporary activation of the imager after the third triggering event; activating the light source in an illumination pattern corresponding to the illumination sequence of the selected operational mode in response to a triggering event; and activating the imager to capture an image, the imager activated in an exposure pattern corresponding to the exposure sequence of the selected operational mode in response to the triggering event.

Aspect 15: Aspect 14, wherein the operational mode is selected based on at least one of the intensity of ambient light, a speed of an object passing through an area over which the imager is configured to capture the image, or an object weight of an object within an area over which the imager is configured to capture the image.

Aspect 16: Any of Aspects 14-15, wherein the third exposure sequence comprises imager activation over a first period of time and the third illumination sequence comprises light source activation over the first period of time, the illumination sequence further comprising gradually decreasing an intensity of light emitted from the activated light source over a second period of time following the first period of time.

Aspect 17: Any of Aspects 14-16, wherein activating the light source includes gradually increasing an intensity of light emitted from the light source and gradually decreasing the intensity of light emitted from the light source.

Aspect 18: Any of Aspects 14-17, further comprising changing the selected operational mode to a different mode of operation in response to receiving a manual input signal.

Aspect 19: Any of Aspects 14-18, further comprising automatically changing from the different mode of operation to the selected operational mode after performing the illumination sequence and the exposure sequence of the different mode of operation.

Aspect 20: Any of Aspects 14-19, wherein each illumination sequence comprises a repeating series of light pulses, each light pulse comprising a portion of emitted red light, a portion of emitted white light, and a portion of ambient light.

Aspect 21: Any of Aspects 14-20, wherein the each exposure sequence comprises an exposure period during which the imager is activated, the exposure period occurring during one of the portion of emitted red light, the portion of emitted white light, or the portion of ambient light.

Aspect 22: A computer-implemented method of illumination and exposure, the method comprising activating one or more light sources to emit a repeating series of light pulses, each light pulse comprising red light, white light, and ambient light; activating a first imager during a first exposure period, the first exposure period occurring during emission of only the red light, the white light, or the ambient light; and activating a second imager during a second exposure period different than the first exposure period, the second exposure period occurring during emission of only the red light, the white light, or the ambient light.

Aspect 23: Aspect 22, wherein each light pulse comprises a first portion of red light, a second portion of white light, a third portion of ambient light, and a fourth portion of white light, the second portion of white light and the fourth portion of white light separated by the third portion of ambient light.

Aspect 24: Any of Aspects 22-23, wherein the fourth portion of white light comprises a decreasing intensity.

Aspect 25: Any of Aspects 22-24, wherein the one or more light sources are activated at an illumination frequency, the illumination frequency being two times greater than both a first frame rate frequency of the first imager and a second frame rate frequency of the second imager.

Aspect 26: Any of Aspects 22-25, wherein the first frame rate frequency of the first imager is offset from the second frame rate frequency of the second imager.

What is claimed is:

1. An image-reading device having a base comprising:
   one or more first light sources configured to emit red light;
   one or more second light sources configured to emit white light;
   one or more first imagers configured to capture a monochrome image of an area;
   one or more second imagers configured to capture a color image of the area;
   a controller comprising at least one processor and computer storage media, the computer storage media having stored thereon computer-readable instructions that, when executed by the at least one processor, cause the at least one processor to:
      select an operational mode defining an illumination sequence for the one or more first light sources and the one or more second light sources, and defining an exposure sequence for the one or more first imagers and the one or more second imagers;
      activate the one or more first light sources and the one or more second light sources in a repeating illumination pattern corresponding to the illumination sequence of the selected operational mode, the repeating illumination pattern including:
         a portion of emitted red light from the one or more first light sources;
         a first portion of emitted white light from the one or more second light sources;
         a portion of ambient light during which the one or more first light sources and the one or more second light sources are not active; and
         a second portion of emitted white light from the one or more second light sources, the first portion of emitted white light and the second portion of emitted white light separated by the portion of ambient light; and
      activate the one or more first imagers and the one or more second imagers in a repeating exposure pattern corresponding to the exposure sequence of the selected operational mode, the repeating exposure pattern including:
         activating the one or more first imagers during the portion of emitted red light;
         activating the one or more second imagers during the first portion of emitted white light; and
         activating the one or more second imagers during the second portion of emitted white light.

2. The image-reading device of claim 1, wherein the operational mode is selected from among a plurality of operational modes, and further comprising automatically changing from a different mode of operation to the selected operational mode after performing the illumination sequence and the exposure sequence of the different mode of operation.

3. The image-reading device of claim 2, wherein the at least one processor is configured to activate the one or more second light sources by gradually increasing an intensity of white light emitted from the one or more second light sources to a period of constant intensity and/or gradually decreasing the intensity of white light emitted from the one or more second light sources from a period of constant intensity during at least one of the operational modes.

4. The image-reading device of claim 2, wherein the at least one processor is configured to select the operational mode in response to a predefined triggering event, and entering a different operational mode following a predefined triggering event termination.

5. The image-reading device of claim 1, further comprising a photosensor device configured to detect the ambient light.

6. The image-reading device of claim 1, wherein the repeating illumination pattern and the corresponding repeating exposure pattern include:
   (a) during a first time, emitting red light and capturing an associated image with one or more of the first imagers for a barcode read,
   (b) during a second time, emitting white light and capturing an associated image with one or more of the second imagers for a barcode read,
   (c) during a third time after the second time, and during the period of ambient light only, capturing an associated image with one or more of the second imagers for reading optical codes on a reflective or glossy surface,
   (d) during a fourth time after the third time, emitting white light and capturing an associated image with one or more of the second imagers for object identification.

7. The image-reading device of claim 1, wherein a duration for the first portion of emitted white light is shorter than a duration for the second portion of emitted white light.

8. The image-reading device of claim 7, wherein a duration for a period of ambient light only is longer than the second portion of emitted white light.

9. The image-reading device of claim 7, wherein the second portion of emitted white light includes a plurality of light pulses modulated at a higher frequency than a frequency for a repeating frequency for the second portion of emitted white light.

10. The image-reading device of claim 7, wherein the first portion of emitted white light is immediately before a period of ambient light only, and the second portion of emitted white light is immediately after the period of ambient light only.

11. The image-reading device of claim 10, wherein the first portion of emitted white light is immediately after the portion of emitted red light.

12. The image-reading device of claim 1, further comprising a top-down reader operatively coupled to the base, wherein the repeating exposure pattern includes:
   activating an imager of the one or more first imagers located within the base during the portion of emitted red light;
   activating an imager of the one or more second imagers located within the top-down reader during the first portion of emitted white light; and
   activating an imager of the one or more second imagers located within the base during the second portion of emitted white light.

13. The image-reading device of claim 12, wherein synchronization for the top-down imaging device relative to a base scanner include the first imager and the first light source being programmed according to a particular timing sequence relative to a timing sequence for the base scanner.

14. The image-reading device of claim 12, wherein the repeating exposure pattern further includes activating the imager of the one or more second imagers within the top-down reader during the portion of ambient light of the illumination sequence.

15. The image-reading device of claim 14, wherein the first portion of emitted white light is emitted by a light source of the one or more second light sources within the top-down reader, and the second portion of emitted white light is emitted by a light source of the one or more second light sources within the base.

16. The image-reading device of claim 1, wherein capturing an associated image with one or more of the second imagers occurs continuously during a first operational mode, and temporarily during a second operational mode responsive to an event trigger.

17. The image-reading device of claim 1, wherein a total duration for the repeating exposure pattern is less than or equal to 12.5 ms with the repeating exposure pattern being repeated at a frequency of 80 Hz.

18. The image-reading device of claim 1, wherein a total duration for the repeating exposure pattern is less than or equal to about 16 ms with the repeating exposure pattern being repeated at a frequency above 60 Hz.

19. The image-reading device of claim 1, wherein the base includes a horizontal section and a vertical section forming a bioptic image-reading device.

20. The image-reading device of claim 1, wherein the operational mode is selected from among a plurality of operational modes including:
   a first operational mode comprising a first illumination sequence having continuous activation of the first light source before a first triggering event and a first exposure sequence having continuous activation of the first imager before the first triggering event;
   a second operational mode comprising a second illumination sequence having temporary activation of the first light source after a second triggering event and a second exposure sequence having temporary activation of the first imager after the second triggering event; and
   a third operational mode comprising a third illumination sequence having temporary activation of the first light source after a third triggering event and based on an intensity of ambient light, and a third exposure sequence having temporary activation of the first imager after the third triggering event.

\* \* \* \* \*

UNITED STATES PATENT AND TRADEMARK OFFICE
CERTIFICATE OF CORRECTION

PATENT NO. : 12,095,958 B2  
APPLICATION NO. : 18/523536  
DATED : September 17, 2024  
INVENTOR(S) : Gao et al.

Page 1 of 1

It is certified that error appears in the above-identified patent and that said Letters Patent is hereby corrected as shown below:

On the Title Page

At Item (73) Assignee; please change "Datalogic USA, inc., Eugene, OR (US)" to --Datalogic USA, Inc., Eugene, OR (US)--

Signed and Sealed this  
Thirteenth Day of May, 2025

Coke Morgan Stewart  
*Acting Director of the United States Patent and Trademark Office*